July 13, 1965

H. D. FANSHAWE 3,194,313

EARTH DRILLING RIGS

Filed Aug. 22, 1961

INVENTOR
HEW D. FANSHAWE
BY Cameron, Kerkam & Sutton ATTORNEYS

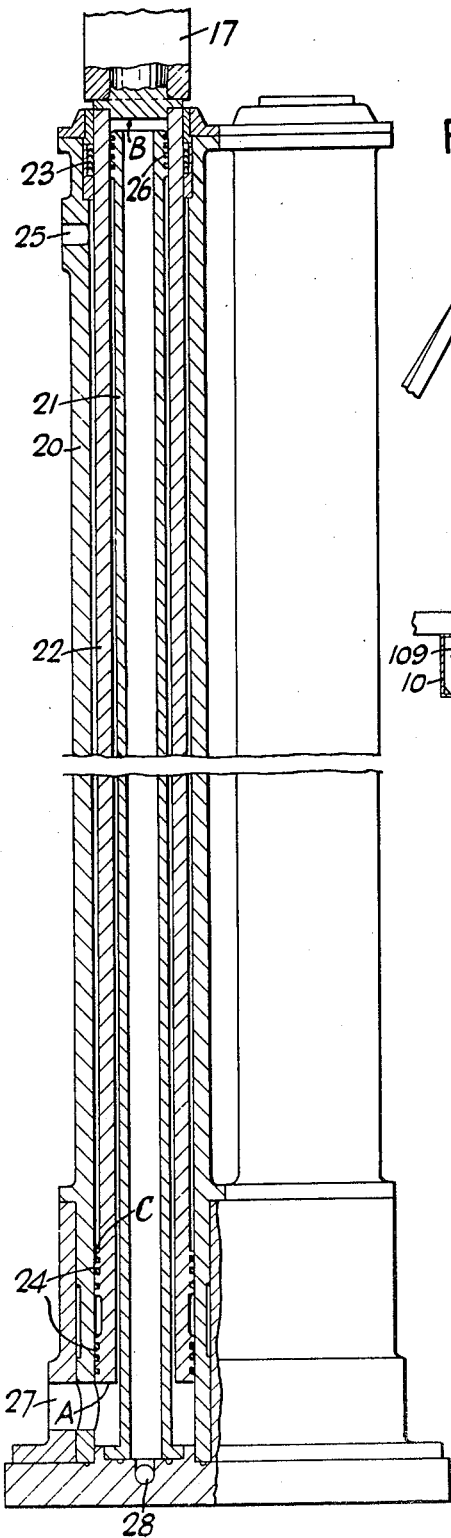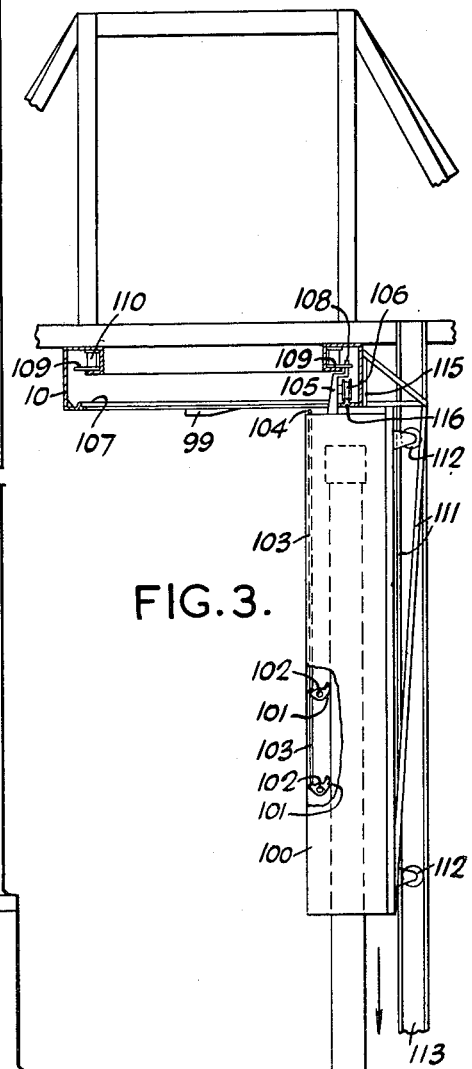

July 13, 1965 H. D. FANSHAWE 3,194,313
EARTH DRILLING RIGS
Filed Aug. 22, 1961 30 Sheets-Sheet 3
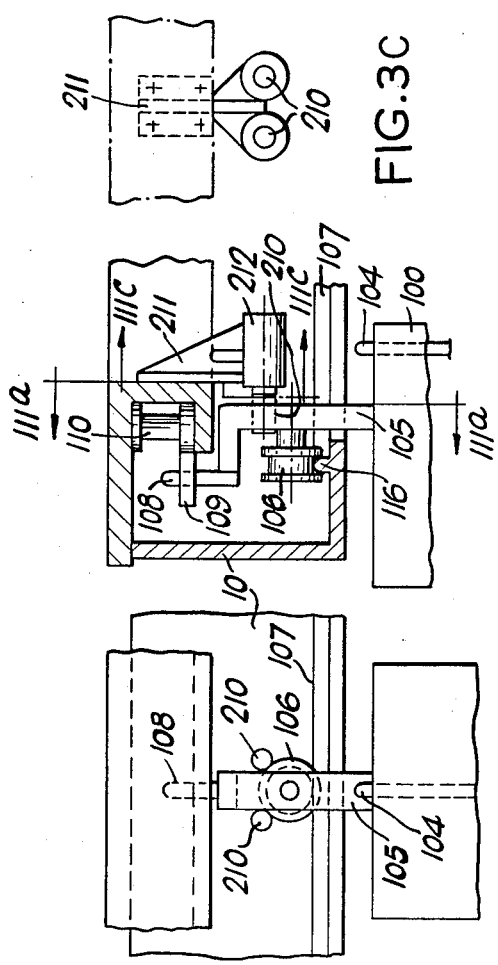
INVENTOR
HEW D. FANSHAWE
BY Cameron, Kerkam & Sutton
ATTORNEYS

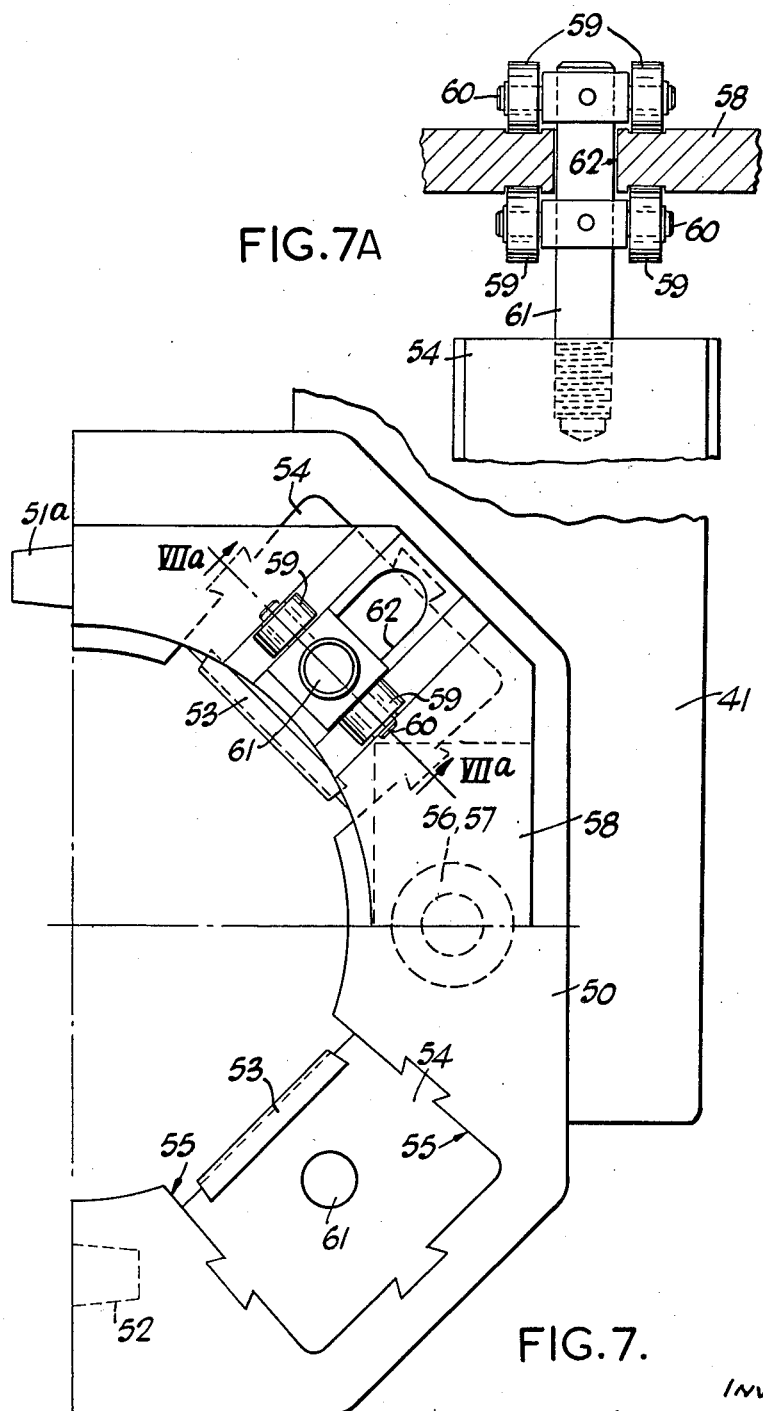

July 13, 1965  H. D. FANSHAWE  3,194,313
EARTH DRILLING RIGS
Filed Aug. 22, 1961  30 Sheets-Sheet 7
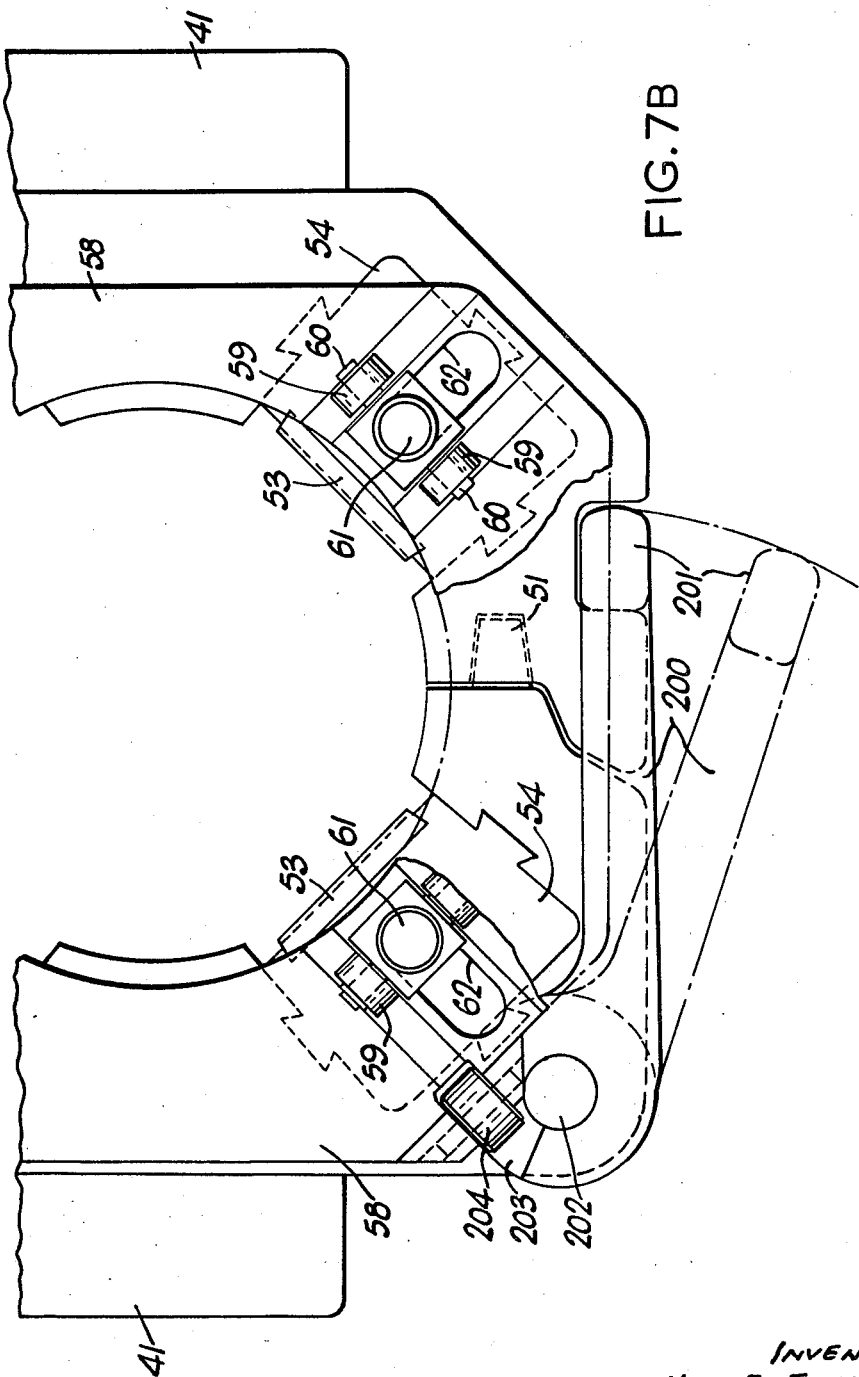
INVENTOR
HEW D. FANSHAWE
BY
Cameron, Kerkam T Sutton
ATTORNEYS July 13, 1965 H. D. FANSHAWE 3,194,313
EARTH DRILLING RIGS
Filed Aug. 22, 1961 30 Sheets-Sheet 10
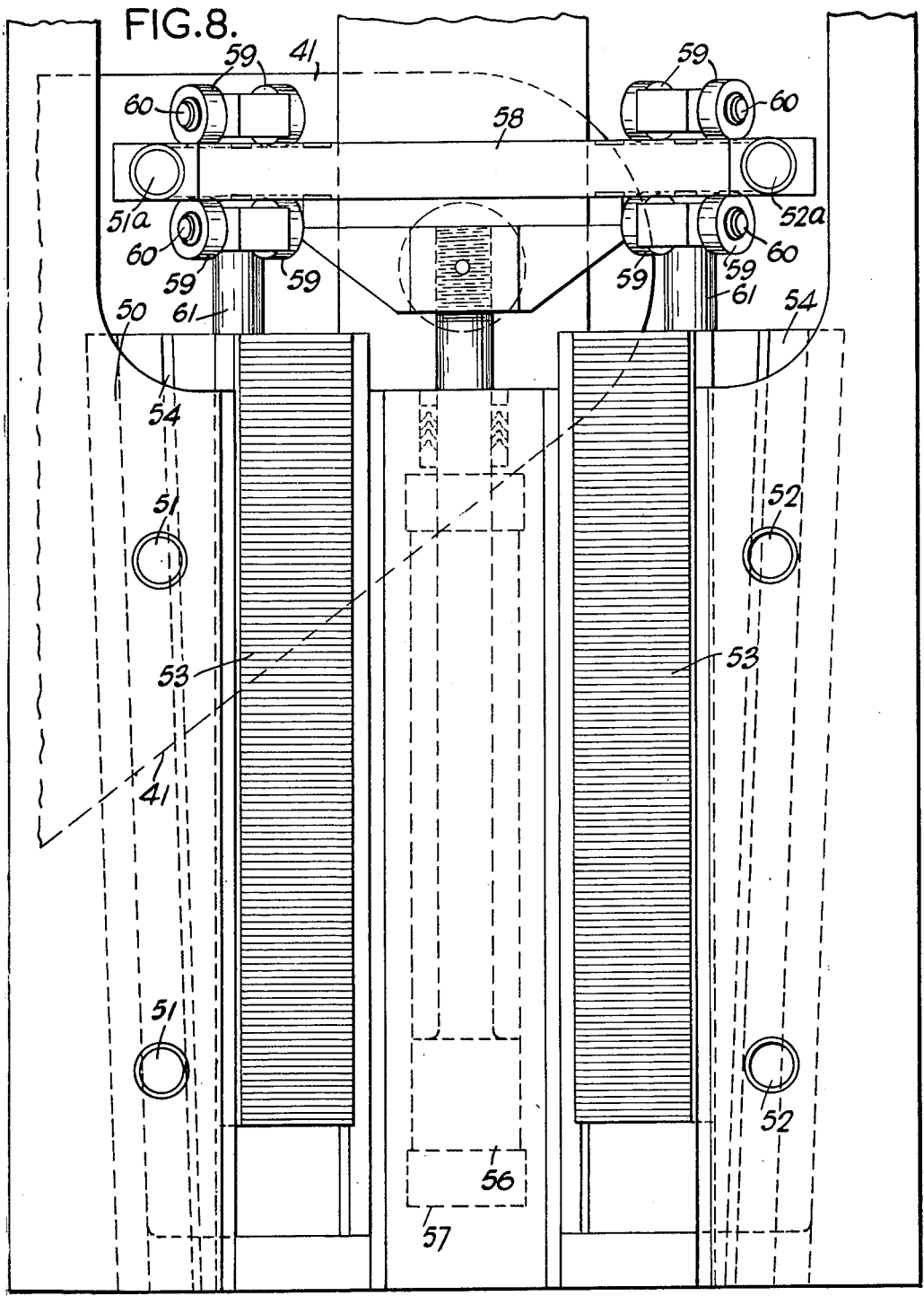
INVENTOR
HEW D. FANSHAWE
By Cameron, Kerkam & Sutton ATTORNEYS

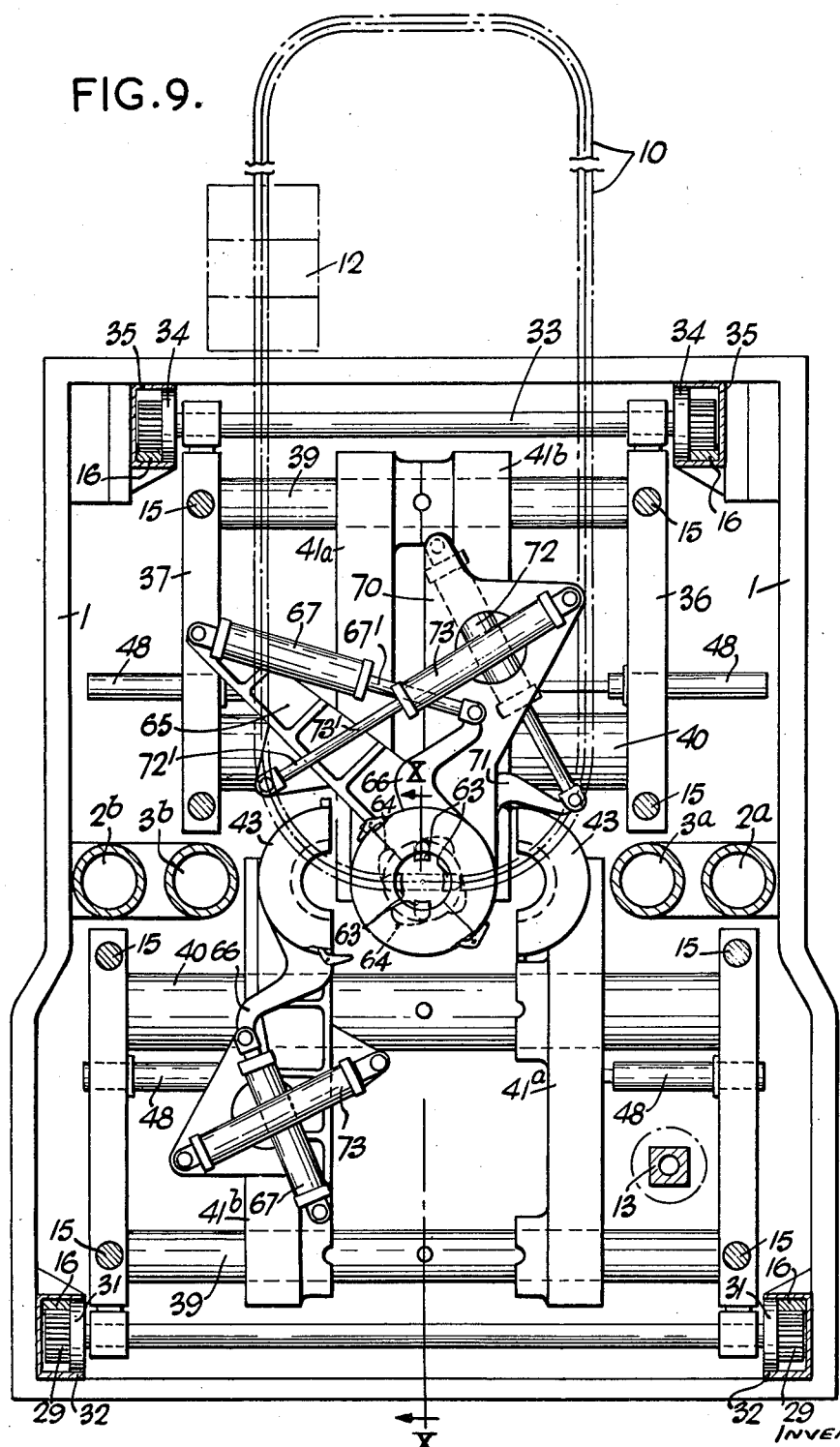

July 13, 1965   H. D. FANSHAWE   3,194,313
EARTH DRILLING RIGS
Filed Aug. 22, 1961   30 Sheets-Sheet 12

INVENTOR
HEW D. FANSHAWE
BY
Cameron, Kerkam & Sutton
ATTORNEYS

July 13, 1965  H. D. FANSHAWE  3,194,313
EARTH DRILLING RIGS

Filed Aug. 22, 1961  30 Sheets-Sheet 14

FIG.IOA

FIG.IOB

INVENTOR
HEW D. FANSHAWE
BY Cameron, Kerkam & Sutton
ATTORNEYS

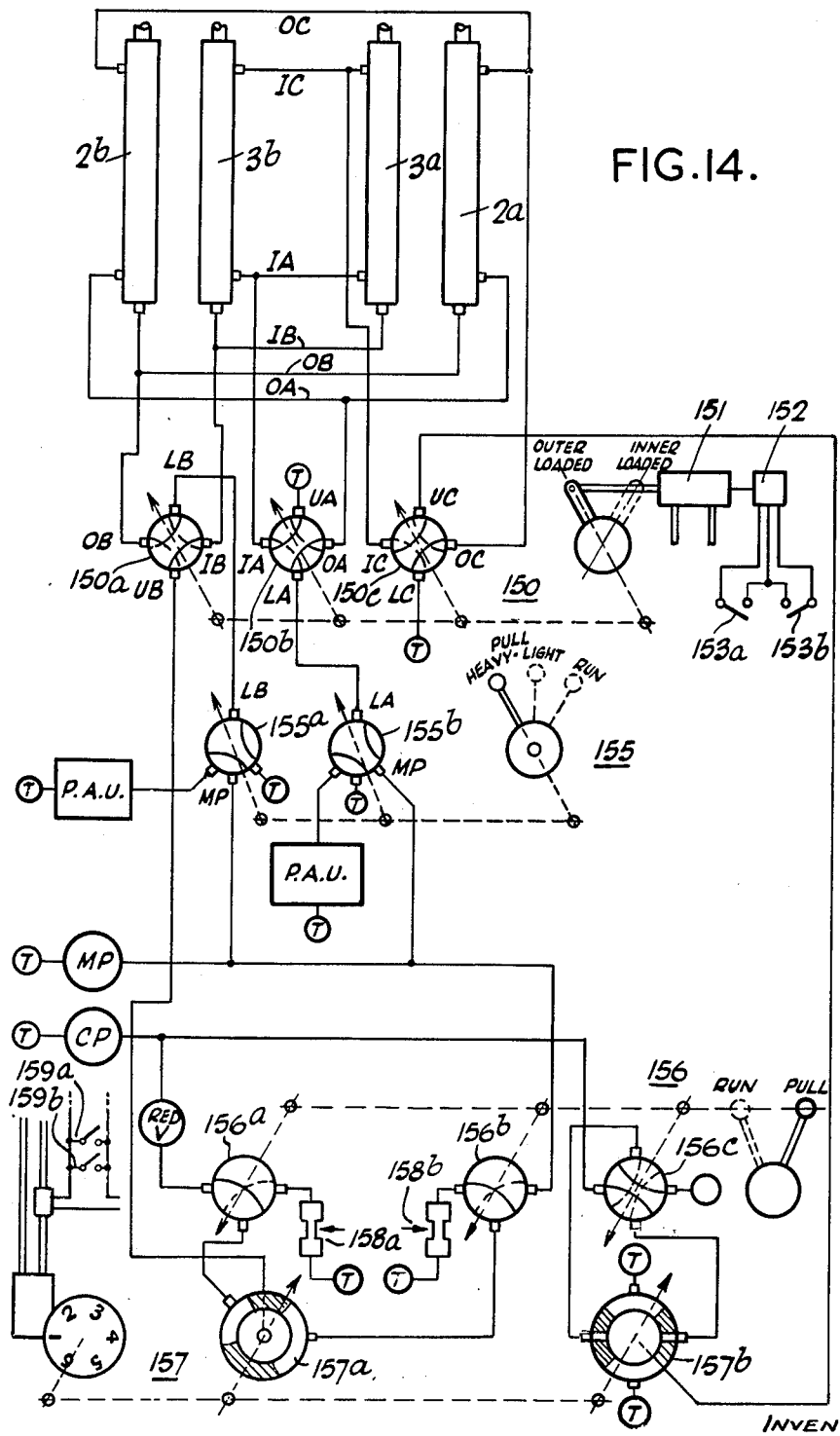

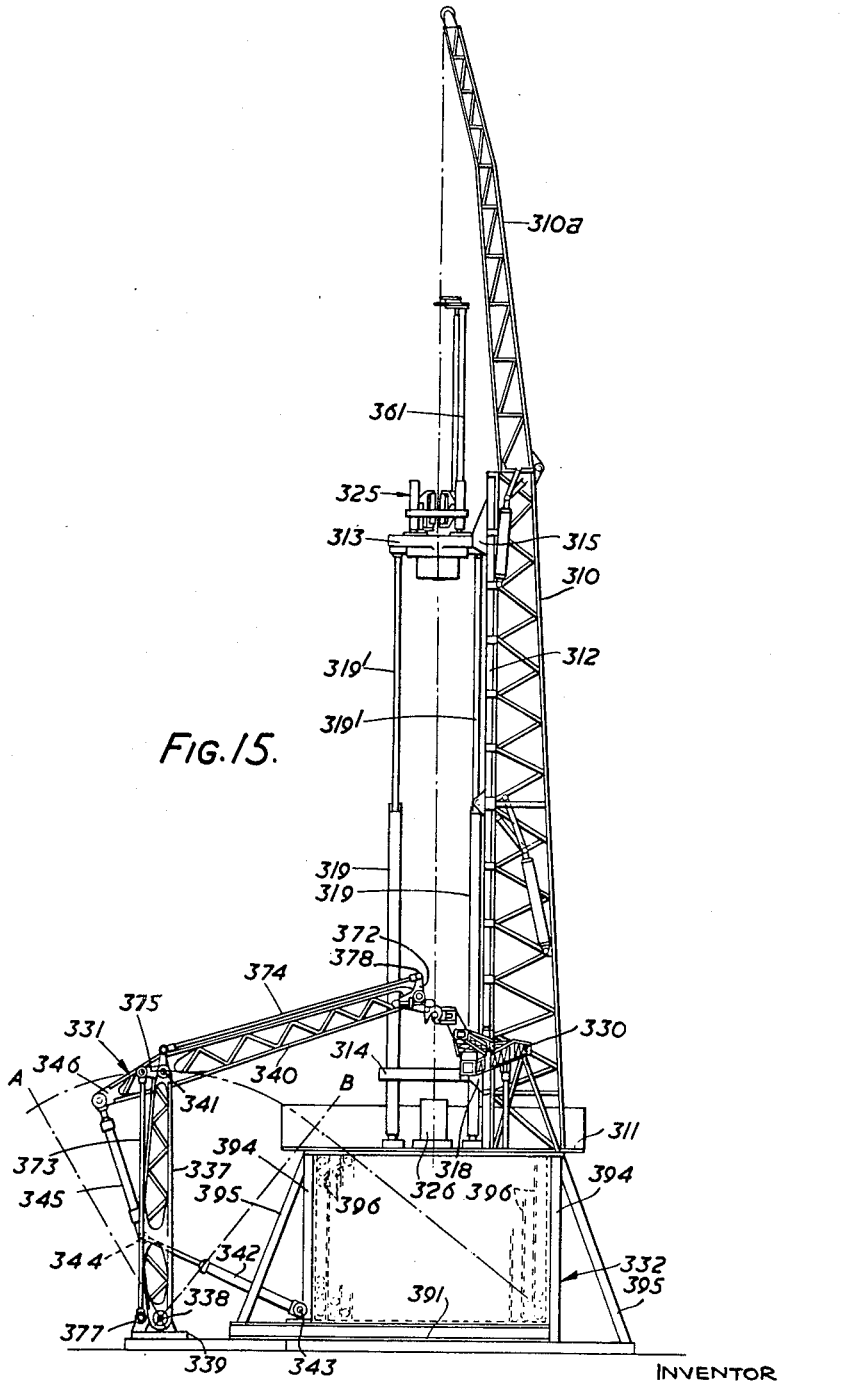

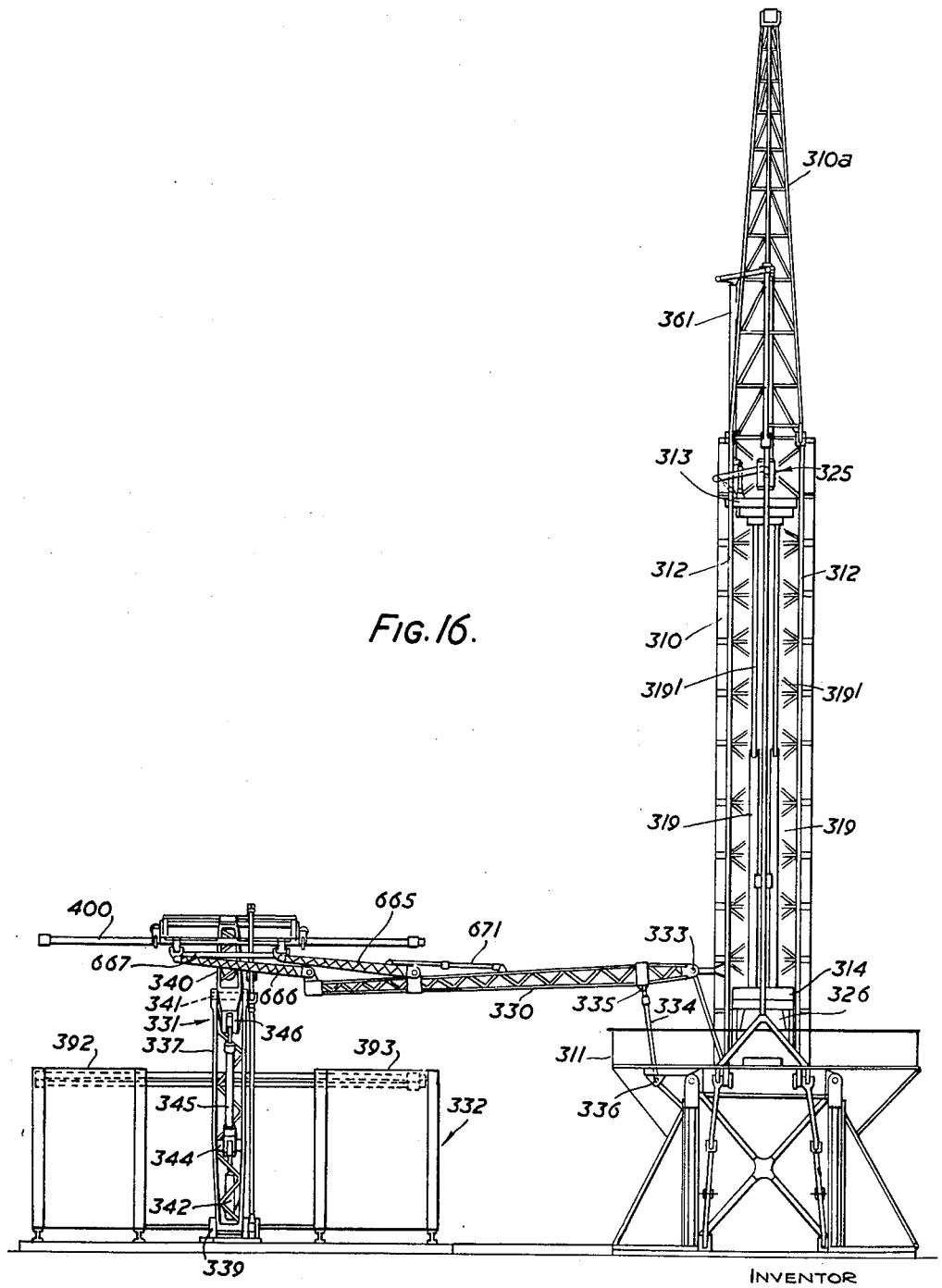

July 13, 1965 H. D. FANSHAWE 3,194,313
EARTH DRILLING RIGS
Filed Aug. 22, 1961 30 Sheets-Sheet 20

INVENTOR
HEW D. FANSHAWE
BY
Cameron, Kerkam & Sutton
ATTORNEYS

July 13, 1965  H. D. FANSHAWE  3,194,313
EARTH DRILLING RIGS
Filed Aug. 22, 1961  30 Sheets-Sheet 21
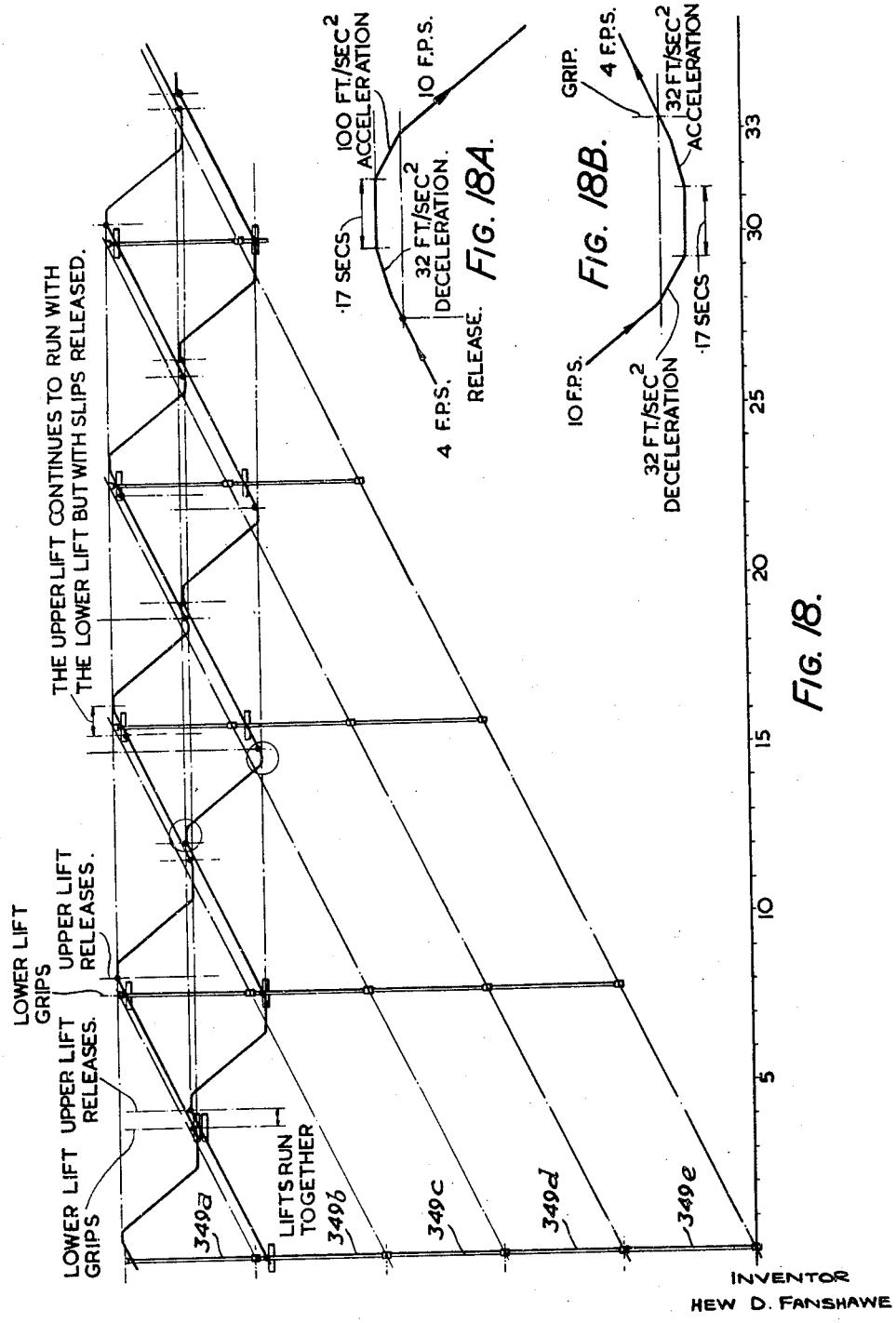
INVENTOR
HEW D. FANSHAWE
ATTORNEYS

INVENTOR
HEW D. FANSHAWE

July 13, 1965  H. D. FANSHAWE  3,194,313
EARTH DRILLING RIGS

Filed Aug. 22, 1961  30 Sheets-Sheet 24

INVENTOR
HEW D. FANSHAWE

BY
Cameron, Kerkam & Sutton
ATTORNEYS

July 13, 1965  H. D. FANSHAWE  3,194,313
EARTH DRILLING RIGS
Filed Aug. 22, 1961  30 Sheets-Sheet 27
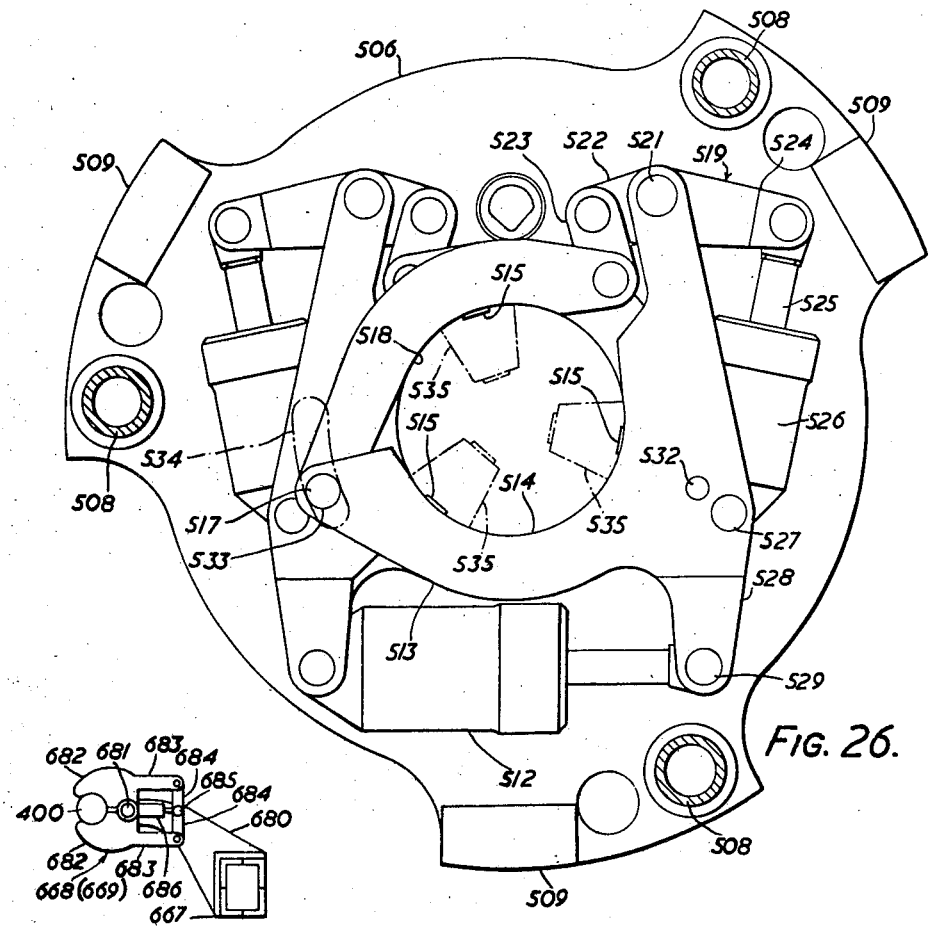
FIG. 26.
FIG. 32.
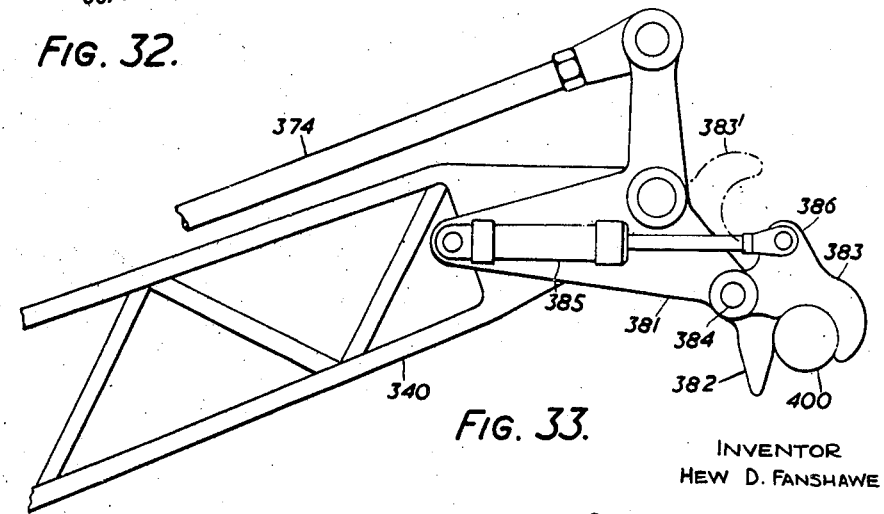
FIG. 33.
INVENTOR
HEW D. FANSHAWE
BY
ATTORNEYS July 13, 1965     H. D. FANSHAWE     3,194,313
EARTH DRILLING RIGS Filed Aug. 22, 1961     30 Sheets-Sheet 30

INVENTOR
HEW D. FANSHAWE

BY
Cameron, Kerkam & Sutton
ATTORNEYS

United States Patent Office 3,194,313
Patented July 13, 1965

3,194,313
EARTH DRILLING RIGS
Hew Dalrymple Fanshawe, Syde, near Cheltenham, England, assignor to F.N.R.D. Limited, London, England, a British company
Filed Aug. 22, 1961, Ser. No. 133,090
Claims priority, application Great Britain, Sept. 24, 1956, 29,153/56; Aug. 9, 1957, 25,259/57
30 Claims. (Cl. 166—77.5)

This application is a continuation-in-part of my application Serial No. 684,235, filed September 16, 1957, now abandoned.

The present invention relates to earth drilling rigs of the kind used for drilling deep boreholes. The invention is mainly applicable to the drilling of boreholes for oil especially at great depths.

In the drilling of boreholes for oil a great deal of the time is taken up with the processes of extracting pipe from the hole for the purpose of changing the drilling bit and returning the pipe to the hole. The greater the depth, the greater the time lost in carrying out these processes, and the present invention is concerned with the problem of speeding them up. Drill pipe is normally manufactured in lengths of approximately 30 feet, successive lengths being joined by tapered screw unions called "tool joints," the male and female members of which are screwed on to the opposite ends of the pipes. When pulling out pipe therefore, it is necessary as each pipe length is pulled clear of the hole, to unscrew it and remove it, and this involves "breaking" the tightly screwed up tool joint, unscrewing the upper pipe to disengage the tool joint and setting aside the upper pipe. In order to reduce the time taken up by this process the tendency has developed for "stands" consisting of several lengths of pipe screwed together to be removed as one piece, the drilling rig being made of great enough height to accommodate the multiple pipe length of the stand. Rigs have therefore become more and more unwieldy, and one of the objects of this invention is to provide a more compact rig. Another object of the invention is to provide a rig which will enable considerable lengths of pipe to be pulled continuously, successive sections of pipe being removed as required without halting the pulling process. A shorter rig is thus made possible since it does not need to be designed to pull long "stands" at a time.

Another object of the invention is to provide a rig in which these processes are carried out automatically so that the process may proceed smoothly and without interruption.

The invention also enables the advantages of hydraulic pulling apparatus to be enjoyed by virtue of the shorter pull required when pipes are removed one by one.

One incidental advantage of using hydraulics lies in the support of the string while drilling is in progress; the outflow from the cylinders may be controlled by a flow-restricting valve or equivalent, giving great delicacy of feed control.

Another advantage is to enable the motors or prime movers to be mounted on the ground and at a safe distance from the borehole. Yet another advantage is that the hydraulic power available can be used during drilling for operating diaphragm-type pumps for the mud circulation, thereby economising in pumping equipment.

An earth drilling rig according to this invention in one aspect comprises at least two lifts, each adapted to pull a drill pipe string and pipe dismantling means adapted to dismantle pipe from said string, wherein at least part of said pipe dismantling means is carried on one of said lifts whereby pipe may be dismantled from said string while said string is in motion.

An earth drilling rig according to this invention in another aspect comprises at least two lifts each adapted to pull a drill pipe string, pipe dismantling means operable to dismantle pipes from a drill pipe string and control means adapted to control the operations of said lifts and said pipe dismantling means to transfer pulling action back and forth between said lifts and to dismantle pipes from a pipe string while said string is in motion. The pipe dismantling means may include means for "breaking" a pipe joint and may also include means for spinning-off the end pipe section and this spinning-off means may also be carried on at least one of said lifts together with said breakout means. Preferably the mechanisms of the rig are reversible in operation so as to be operable to return pipe to the hole, said pipe dismantling means then operating at least to tighten a newly made pipe joint and preferably also to screw up a new section.

The lifting means may be adapted to operate either over the same stroke, or over different strokes one above the other. If they operate over the same stroke, which means that they have to pass one another, preferably each carries pipe dismantling means, the means associated with one lift being movable away from the path of the drill string so as to allow the drill string and the pipe dismantling means carried by the other lift to pass. If the lifts operate over different strokes so that they are not required to pass one another, the pipe dismantling means may be carried on one of the lifts.

The means for removing unscrewed pipe sections from the path of the ascending pipe string may include means for transporting them to storage means at ground level, and is preferably reversible in operation so as to supply pipes to the string when returning pipe to the hole, i.e. when "running-in."

At least one of said lift means is provided with or adapted to receive means for rotating a pipe and supplying drilling mud thereto for the drilling operation.

In the apparatus in one of its forms, which will be described by way of example, the lifting means comprise two pairs of hydraulic rams each pair carrying a lifting platform which in turn carries a pipe gripping and unscrewing mechanism. One pair of rams straddles the other pair, which in turn straddles the drill hole and the two platforms carried by the rams lie on opposite sides of the central plane in which the rams and the borehole are located. The pipe dismantling means comprises three sections, one of which serves for gripping the pipe for the purposes of pulling the pipe string, one, the break-out section, for breaking the joint prior to unscrewing, and one for spinning off the end pipe after the joint has been broken. The pipe gripping or "slips" section and the break-out section are both made in two halves each supported on an arm projecting from the respective platform so as to lie in the central plane of the machine, and means are provided so that at the appropriate times the two halves may be moved towards one another and locked together so as to become an operative whole, and at other times may be moved away from one another so that the drilling pipe and the pipe dismantling mechanism on the other lift may pass between them.

Of the pipe dismantling mechanism, the slips section is adapted to grip the pipe below a tool joint so as to take the load of the drilling string while pulling, the "break-out" section is adapted to grip the tool joint above and below the line of separation and the unscrewing means is adapted to grip the pipe above the tool joint for the purpose of unscrewing the end pipe section. It should perhaps be mentioned here that it is necessary for the "break-out" means to grip the tool joint itself and not the pipe so that the tool joint will be broken at the proper place; otherwise there is a danger that one part of the tool joint will be unscrewed from the end of its pipe or that the pipe will be damaged.

The two ram pairs are arranged to operate over the same stroke, which is made a little longer than the longest pipe length. Each ram pair will then pull one section of pipe, break the joint and unscrew it ready for removal by the racking means (not yet described), while the other ram returns to the bottom of its working stroke ready to grip the next pipe joint, take over the pulling action and remove the next pipe section.

It will be appreciated that the process can only proceed in a smooth uninterrupted manner if the uppermost pipe sections are removed sufficiently rapidly to enable the pulling to proceed without a disconnected pipe fouling the rising drill string. Accordingly, means are provided for removing the pipe sections as they are dismantled and transporting them to storage space at the foot of the rig.

The entire rig is preferably assembled within a framework the main functions of which are as follows:

(1) To steady the rig and provide guiding rails for various vertically reciprocating parts.

(2) To support the pipe handling means which conveys the pipes to and from the string.

(3) To support ancillary gear, such as piping for carrying the drilling mud to the mud swivel during drilling operations, driving gear for rotating the pipe while drilling and so on.

The control mechanism whereby the various movements of the hydraulic lifting rams, pipe gripping and unscrewing mechanisms and the pipe handling mechanisms are all controlled is conveniently for the most part hydraulic in nature, although parts of it may with advantage be made electric and will include sensing means adapted to sense the arrival of a tool joint at a point accessible to the rig mechanisms, means to cause operation of the gripping means (slips) to cause them to grip the pipe at the correct location, and to cause operation of the break-out and unscrewing operations in the correct sequence and with the correct timing. Additionally the control mechanism will be required to control the operation of the pipe handling means so as always to present a holder for reception of the pipe section leaving the top of the drilling string. Other functions of the control mechanism will appear as the detailed description proceeds. Procedure when pulling pipe is as follows. Let us start with one lift, which will be called "lift A," at the bottom of its stroke waiting to take over the pulling of the drill string. The other lift, "lift B," is pulling the string, and when a tool joint approaches the gripping mechanism of lift A, the sensing device will operate, set lift A in motion, lift A will start to rise, quickly reaching the same velocity as the drill string, and its gripping mechanism will operate to grip the drill string a little below the tool joint which has just reached it. Shortly after this and when lift A has firmly taken hold of the string, lift B will approach the top of its travel and will release the top of the drill string. It now remains for the mechanism carried on lift A to break the newly emerged tool joint and spin off the top section of pipe while pulling the drill string, the whole operation being completed and the top section of pipe moved away from the path of the string by the time lift A reaches the top of its stroke. The unscrewing action by which the top pipe section is removed from the string may be carried out either by mechanism associated with the lift as above described or mechanism may be provided for this purpose associated with the pipe handling mechanism. In either event, the pipe handling mechanism should be arranged to receive and support the topmost pipe section before disconnection is completed.

These operations being complete and lift A having nearly reached the top of its stroke, lift B takes over at the next tool joint and lift A returns to the bottom of its stroke. This downward stroke takes place faster than the upward pulling stroke so that lift A will have reached its lowermost position before lift B has again reached the top of its stroke. This enables the mechanism to accommodate individual pipe sections which vary in length, since each lift will wait in its lowermost position until the next tool joint appears, and the time during which it waits will depend upon the length of the pipe section at that time emerging from the borehole. When the tool joint appears, the sensing device associated with the waiting lift starts operation of the gripping mechanism associated with that lift so that the next tool joint is gripped, broken out and the topmost pipe section spun off and removed.

When the drill collars at the end of the string are reached in the pulling operation, it may be preferred to stop the apparatus and proceed under manual control, the tools by which the string is handled being suitably modified to allow for the different diameter of the drill collars from that of the pipe or the tool joints. Alternatively the mechanism may be designed to operate effectively on the drill collars as well as on tool joints and to proceed automatically. To this end it may be necessary to provide at least one additional sensing device to sense the arrival of a drill collar joint as distinct from a pipe joint, one difference being that the joint between two drill collars lacks the shoulders which the tool joint makes when it gives place to pipe.

When running in pipe the operation as a whole is reversed. The one lift at the top of its stroke will fall, lowering the drill string into the hole, and the racking mechanism working in reverse will present a new pipe section for connection to the string. The second lift will wait at the top of its stroke for the top of the newly fixed pipe section to reach its gripping mechanism. A sensing device which may be, at least in part, the same sensing device as was used at the lower end to signal the arrival of the tool joint in the gripping mechanism, will respond to the approach to the gripping mechanism of the tool joint part on the upper end of the pipe and will cause the gripping mechanism to take a full load-carrying grip on the pipe immediately below the tool joint. Also the lift will be started on its downward journey and rapidly accelerated to the speed of the descending drill string. At the same time a new pipe section is presented to the gripping mechanism by the racking mechanism and the gripping mechanism associated with the lift will go through its operations of screwing on the new pipe section and tightening it up, using for this purpose the same mechanisms as were used for spinning off the pipe and breaking the tool joint respectively during the pulling-out operation.

During this running-in procedure the lifts are operated in a reverse way to that in which they are operated for pulling, that is to say they descend more slowly than they rise. In other words the unladen lift will rise to the top of its stroke in less time than it takes the laden lift to reach the bottom of its stroke, thus allowing the waiting time mentioned above. It will be understood that this waiting time will vary according to the length of the pipe section last added to the string.

For drilling purposes it is preferably arranged that either of the two lift mechanisms can be used, although it is not material from the point of view of saving time whether both lifts or only one can be used and it may be preferred for economy of equipment to arrange for only one of the two lifts to be applied to the drilling regime. Whichever lift is to be used for drilling will have attached to it as the need arises, a mud swivel, which term is used here to include the mechanism for rotating the drilling string and mechanism for introducing drilling mud.

The invention will be understood from the following description of examples of drilling rig according thereto given with reference to the accompanying drawings in which:

FIG. 3 is a rear elevation of the top of the rig;

FIGS. 3A, 3B and 3C are fragmentary elevations showing a mechanism for aligning the hangers, FIGS. 3A and 3C being views taken substantially from the planes IIIa—IIIa and IIIc—IIIc respectively in FIG. 3B;

FIG. 5 is a sectional view of a hydraulic ram used in the rig;

FIG. 8 is an elevation of the part shown in FIG. 7;

FIG. 9 is a plan view of the platform mechanisms in the passing position but with the platforms and spin-off mechanisms removed, taken substantially from the plane IX—IX in FIG. 1;

FIG. 10A is a fragmentary perspective view of part of the break-out mechanism showing a latch mechanism therefor, and FIG. 10B is a fragmentary plan view of a detail of the mechanism shown in FIG. 10A;

FIG. 13 is a plan view of the racking trolley;

FIG. 14 is a diagram of the control equipment;

FIG. 15 is an elevation of another form of rig according to the invention with the mechanisms thereof shown in one operative position;

FIG. 16 is an elevation of the rig seen from the right hand side of FIG. 15;

FIG. 18 is a timing diagram and FIGS. 18A and 18B are portions of the diagram of FIG. 18 on an enlarged scale;

FIG. 26 is a plan view from below of the break-out mechanism with the lower plate of the housing removed;

FIG. 32 is a detail view of pipe gripping jaws on the transport arm;

FIG. 33 is an enlarged detail of the racking arm.

Figure 1:
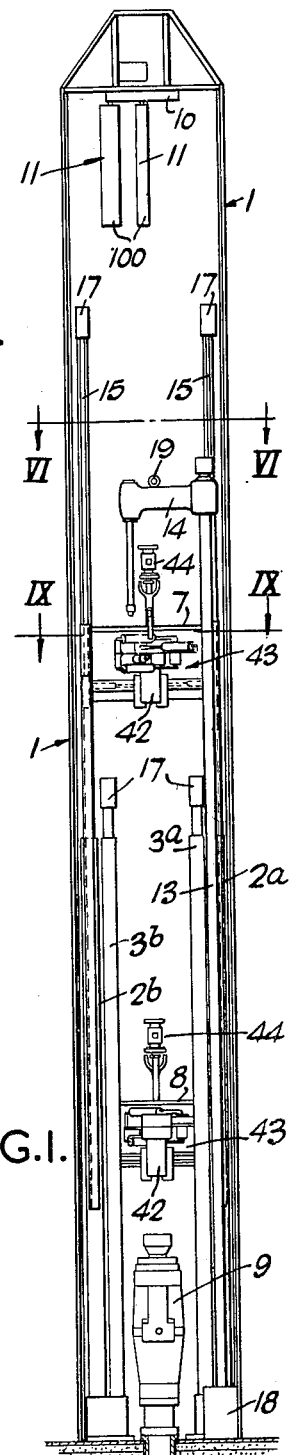
FIG. 1 is a front elevation of one example of rig omitting some of the framework.

The general arrangement of one form of the equipment is shown in FIGS. 1-4. The view shown in FIG. 1 is taken from what will for convenience be referred to as the front of the equipment, so that FIG. 2 becomes a side view and FIG. 3 a rear view. The equipment comprises a main framework 1 within which are the two pairs of hydraulic rams 2a, 2b and 3a, 3b. These rams are located in the central plane of the main framework and straddle the bore hole which is, of course, at the center. Rearwardly of the main framework extends a subsidiary supporting frame 4 which serves to support the pipe handling mechanism by means of which pipes are removed from the drill string and transported to storage equipment on the ground. The framework 4 straddles a railway track 5 on which runs a trolley 6 in which the pipes are stored when not in the bore hole, as will be further described below. The outer pair of hydraulic rams 2a, 2b carries a platform 7 shown at the top of its stroke, while the inner pair of rams 3a, 3b carries a platform 8 shown at the bottom of its stroke. It will be observed that these platforms "hang" on stay rods 15 from beams 17 supported on the tops of the hydraulic rams and are guided on vertical channel irons 32, 35 (FIG. 6) supported by the framework 1.

The platforms 7 and 8 carry mechanisms for gripping the pipe below a tool joint, breaking-out the tool joint and gripping the pipe above the tool joint for the purpose of unscrewing the topmost section and so dismantling the drill pipe string while it is in motion. These mechanisms will be described in more detail later. At the top of the rig there is provided a rail 10 which serves to convey pipe sections to and from the center of the rig where they are removed from the pipe string or supplied to it for connection thereto. Hanging from the rail 10 are devices which will be termed hangers 11, each of which is adapted to receive a pipe section and hold it at appropriate times. There is a considerable number of these hangers, that is to say a number in excess of those required to hold pipe at any one time, and they circulate around the closed loop of rail 10 so as to be presented to various stations at appropriate times, as will hereinafter appear. One section 12 of the rail 10, hereinafter termed the "batcher," is arranged to be separable from the remainder of the rail and is removable vertically on a lift carried by the subsidiary framework 4. The batcher serves to remove pipes from the rail 10 down to the trolley 6 in which they are stored when pipe is being pulled, and conversely raises pipes from the trolley 6 to the top of the rig when running-in pipe. The combination of the railway 10, the hangers 11 and the batcher 12 is referred to herein collectively as the pipe racking mechanism and its function will be described in detail later, but in general is as follows. Assume that drill pipe is being pulled out of the borehole and the batcher 12 is in position in line with the main rail 10. The batcher receives from the rig, along the railway, hangers 11, each of which is supporting a pipe. When a complete batch of pipes has been built up in the batcher 12 the supply of pipes from the rail is held up by a catch, and the batcher 12 is lowered so as to bring the batch of pipes down into the trolley 6. At the bottom of the run, the hangers 11 are arranged to release the pipes automatically so that the batcher 12 can immediately be restored to its topmost position closing the gap in the rail 10. The empty hangers can now move from the batcher on to the rail to be replaced by further hangers carrying pipes which have accumulated at the end of the rail 10 on the rig side of the gap into which the batcher 12 fits. The batcher 12 is thus again loaded and when the batch is complete it again descends to deposit this batch of pipes in the trolley 6. In the meantime the trolley 6 has been moved a short distance along the rails so that the new batch of pipes will be lowered into position alongside the previously deposited batch. The empty hangers are fed around the rail 10 and accumulate in a waiting location adjacent the central axis of the rig so as to be moved one at a time into position over the axis of the drill string to receive further lengths of pipe as they are pulled out from the borehole and dismantled from the drill string.

When running-in pipe, of course, the action is reversed, that is to say the batcher carrying a full batch of empty hangers descends to the trolley 6, picks up a batch of pipes, returns to the level of the rail 10 and its laden hangers are replaced by empty ones. The laden hangers are moved around the rail to a waiting station from which they are taken one at a time at the appropriate times and moved into position above the drill string so as to be available for addition to the drill string as required.

Figure 6:
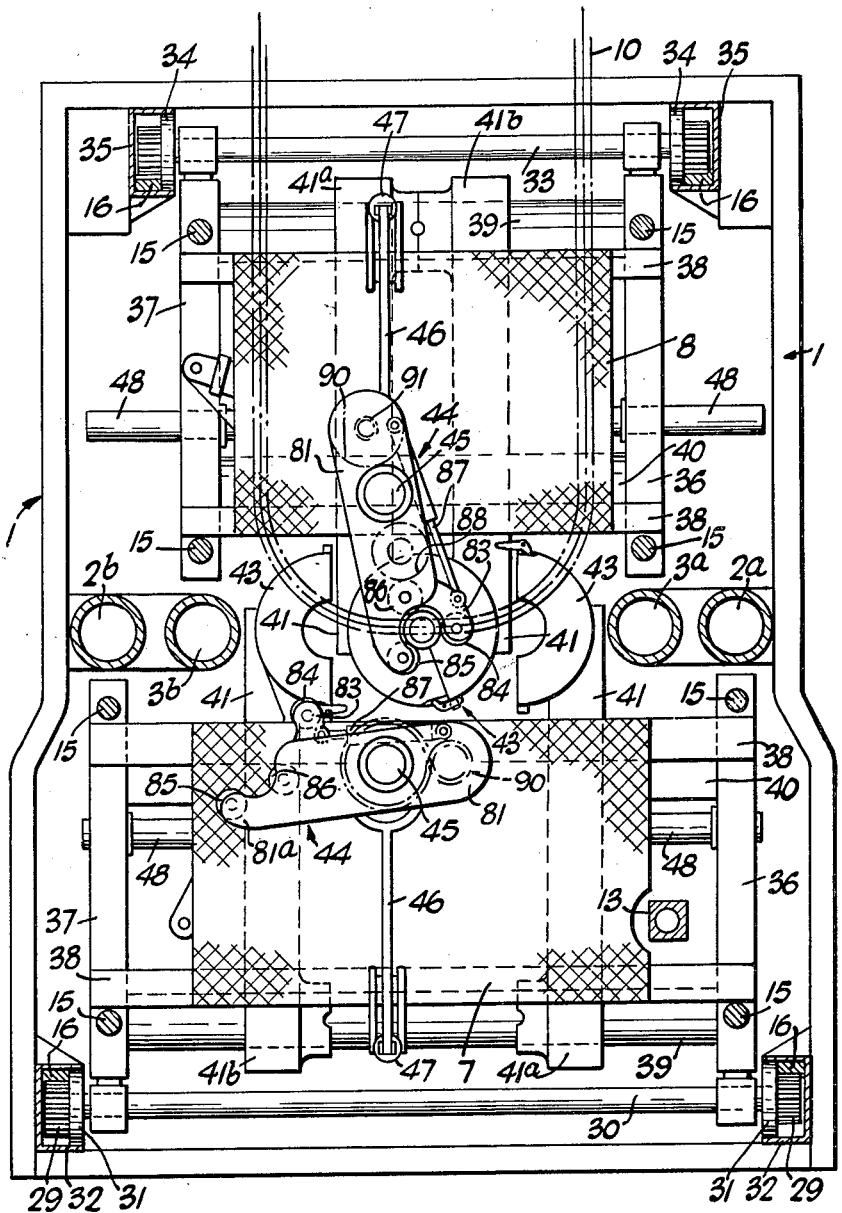
FIG. 6 is a plan view of the travelling platforms and associated mechanisms of the rig at the passing position, taken substantially from the plane VI—VI in FIG. 1.

No rotary table need be provided in the rig. Instead there is provided a power driven swivel 14 which is vertically slidable on a square section or "Kelly" drive shaft 13 which extends up one corner of the rig passing through platform 7 (FIG. 6). This carries the drive from motor 18 to the swivel which can be brought into action for rotating the drill string when drilling and stored above the throw of the platform 7 at other times. A lifting eye 19 may be used to support the swivel on a sling from the top of the rig when not in use. When drilling it is swung to the center of the rig and carried on either platform 7 or 8. The normal throw of the platforms 7 and 8 is limited at the lower end to a convenient height above ground level to provide the usual working space around the foot of the drill pipe for ancillary equipment, such as a blow-out preventer etc. shown at 9, forming no part of the present invention. Some additional space is also needed to allow for emergency override travel of the platforms for safety purposes when running-in. Some of this space may be employed when drilling to enable the stroke of the mud swivel to be increased below the normal level of the pulling stroke.

The various component parts of the rig according to the invention will now be described in detail in turn.

THE HYDRAULIC RAMS

The rams 2a, 2b and 3a, 3b are all fundamentally alike and it will therefore be necessary only to describe one of them. FIG. 5 is a longitudinal sectional view, partly broken away, of a ram. It will be seen to comprise an outer cylinder 20, an inner cylinder 21 and a hollow piston rod 22 which operates in the space between them and supports the beam 17 on its upper end. An oil seal 23 carried by the upper end of the outer cylinder 20 seals the space between it and the outer surface of the piston rod at the top and oil seals 24 carried by the piston rod seal this space at the lower end of the piston. An inlet for pressure fluid is provided at 25 connecting with the enclosed space between the outer cylinder and the piston. A further oil seal 26 is provided at the upper end of the inner cylinder and seals the space between the outside of the inner cylinder and the inside surface of the hollow piston rod, and the space between the inner cylinder and the inside of the hollow piston rod is fed with pressure fluid through an inlet 27. An additional fluid inlet 28 connects with the interior of the cylinder 21. The dimensions of the various bores are chosen so that the effective areas of the hydraulic thrust surfaces: (a) on the lower end of the piston rod (the annular surface A), (b) on the inside of the piston rod through the cylinder 21 (the piston head B) and (c) on the outside of the piston rod (the annular surface C), are related in the ratio 4:2:1. It will be observed that the pressure exerted by fluid introduced through inlet 25 operates downwardly on the piston rod while the other two pressures operate upwardly. It will now be seen that by the choice of different combinations of fluid supply, different thrusts can be achieved with the ram as follows:

| Operative inlets: | Effective thrust (α effective area) |
|---|---|
| 27, 28 | 4+2=6 units. |
| 25, 27, 28 | 4+2−1=5 units. |
| 27 | 4=4 units. |
| 27, 25 | 4−1=3 units. |
| 28 | 2=2 units. |
| 28, 25 | 2−1=1 unit. |
| None | Nil. |
| 25 | −1=1 downwards. |

Thus an effect is obtained equivalent to a gear box having six forward speeds, neutral, and one reverse speed.

The effect of this is to enable pumps with limited capacity to apply their full power to pulling all but the lightest loads so that maximum pulling speed within the limitations of the power available can be achieved for a large range of drill string lengths.

*Platform mechanisms*
GENERAL ARRANGEMENTS

Figure 9A:
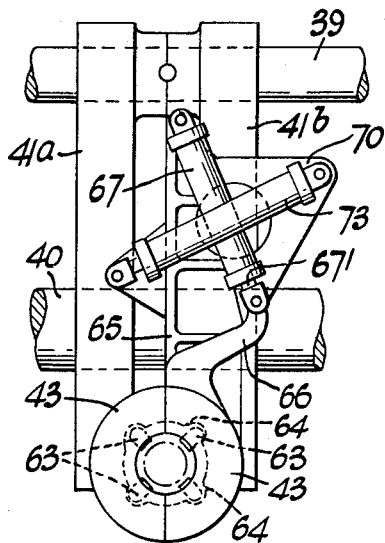
FIGS. 9A, 9B and 9C are fragmentary plan views showing the break-out mechanism in successive stages of operation.
Figure 9B:
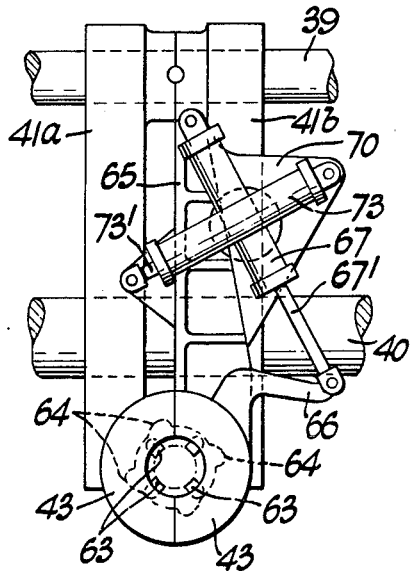
Figure 9C:
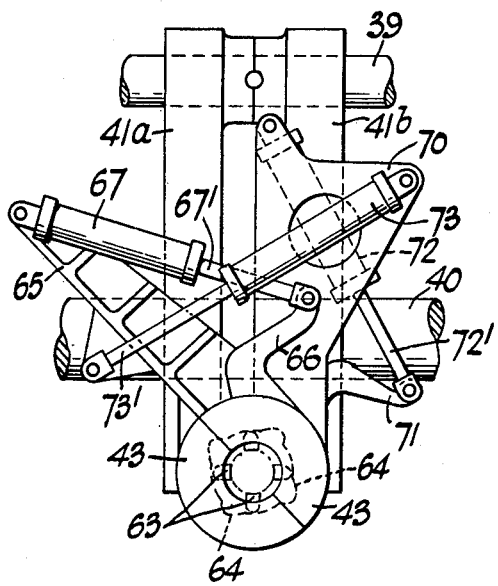
Figure 10:
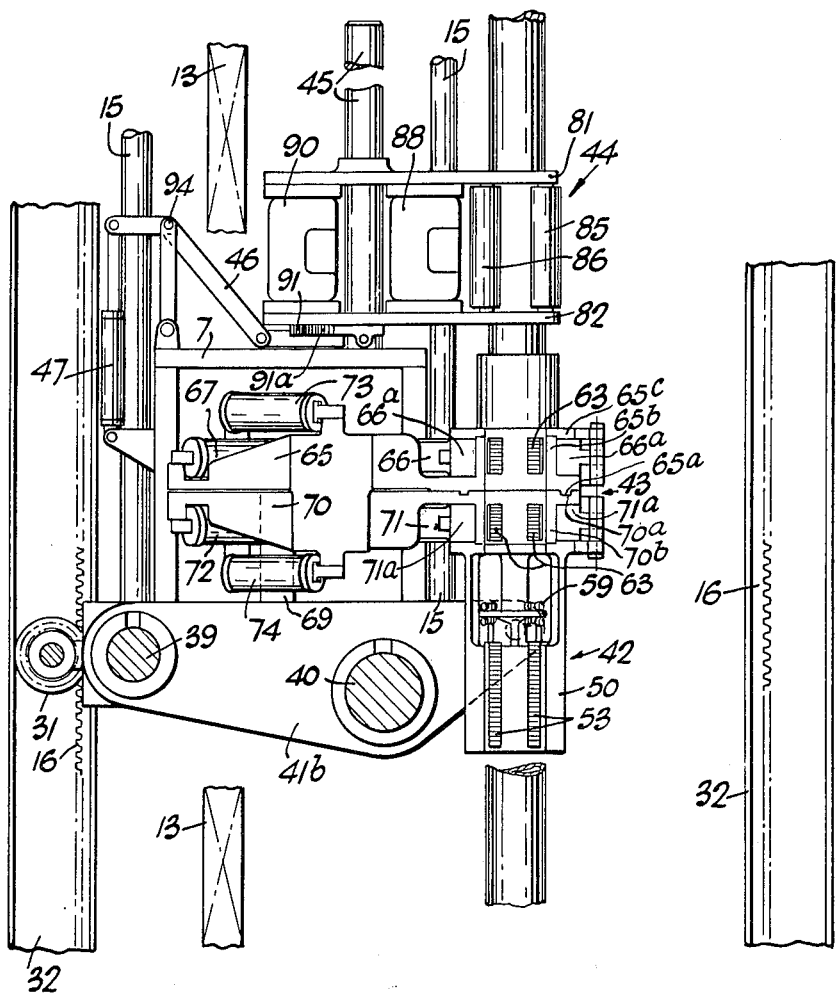
FIG. 10 is a side elevation of a set of platform mechanisms, taken substantially from the plane X—X in FIG. 9.

The apparatus carried by the pulling platforms 7 and 8 is shown in FIGS. 6–10. FIG. 6 is a plan view of the two platforms passing and FIG. 9 is a similar view, the section being taken, however, below the platforms proper so that the break-out mechanisms are shown. FIGS. 7, 7A and 8 give details of the slips mechanisms, while FIG. 10 is a side elevation of one complete platform mechanism. From the plan views the rear platform 8 is seen to be narrower than the front platform 7. This is because it is convenient to match the sizes of the platforms to the spacings between the respective pairs of rams from which they hang. The platforms are steadied by the channels 32, 35 provided on the main structure as above described. Platform 7 carries the axle 30, the ends of which carry wheels 31, running-in channels 32 and pinions 29 engaging racks 16 provided in the channels 32. This arrangement helps to maintain the platform level. Similarly platform 8 carries axle 33 bearing wheels 34, running-in channels 35, and pinions running on racks in channels 35. Since the two platform mechanisms are essentially alike it will be convenient to describe in detail only one of them. The main framework of platform 8 comprises a pair of side members 36 and 37, between which extend cross members 38 which support the platform proper. Between the side members 36 and 37 extend bearer members 39 and 40 which support two trunnion arms 41a and 41b. These extend into the central plane of the rig and carry on trunnions 41 at their ends the pipe gripping slips 42 (FIG. 10) and the break-out mechanisms 43 (FIGS. 6, 9 and 10). The trunnion arms 41a and 41b are slidable towards and away from one another along the bearer members, being actuated by hydraulic rams 48 connected to the bearer members. The slips 42 with the break-out mechanism mounted immediately above them at 43 are best shown in FIG. 10.

The platforms also carry the "spinning-off" mechanism. This mechanism grips the pipe above the tool joint and after the joint has been broken by the break-out mechanism, unscrews the top section, lifts it clear of the drill string, causes it to engage with one of the hangers of the pipe handling mechanism, and moves the lower end of the unscrewed pipe out of the line of the rising drill string. This mechanism comprises a pipe gripping and spinning unit 44, which will be described in greater detail later, which is mounted on a vertical spindle 45 upon which it can turn and also execute a rising and falling motion under the action of an actuating arm 46 powered by a hydraulic cylinder 47 (FIGS. 6 and 10).

In the above description and hereafter, the hydraulic cylinders referred to are all double-acting so that reference will be made simply to "expanding" and "contracting" them to operate them in the respective senses.

THE SLIPS

The slips 42 are required to grip the pipe below a tool joint sufficiently firmly to take the whole weight of the drill string and exert on it the necessary pulling force to withdraw it from the borehole. As will have been understood from the above description of the general arrangement, they are divided into two parts, each part being mounted on one of the trunnion arms, the two parts being brought together to form an operative whole at the appropriate time in the machine cycle. FIG. 7 is a plan view and FIG. 8 is a side view of one half of the mechanism. The main body or bowl 50 is, as indicated in FIGS. 7 and 8, mounted directly on trunnion 41 and is provided with dowels 51 and dowel holes 52 by which it mates with the other half when the two halves are brought together. Latching detents of any suitable character are provided to lock the two halves in operative engagement during their operative phase. The grip on the pipe is provided by friction members 53 carried on sliding wedges 54 housed in channels 55 formed in the main body 50. Above the wedges is provided a yoke member 58 which is in two halves, one half being carried by each trunnion arm, and each half is provided with a dowel 51a and a dowel hole 52a (FIG. 8) for registration with its opposing half as in the case of the main body 50. Latch means are provided to link together the two halves of the yoke. A lifting bar 61 connected to each wedge passes through a radial slot 62 in the yoke and spindles 60 carrying rollers 59 are provided passing through head members on the lifting bars one pair of rollers lying above and the other below the yoke 58 (FIG. 7A). It will now be seen that as the yoke is raised and lowered the wedges 54 will rise and fall and the wedges will move radially, the radial movement being accommodated on the yoke 58 by the slots 62 and the rollers 59. The yoke is raised and lowered by means of a piston 56 operating in a cylinder 57 connected with the main hydraulic fluid supply through control mechanism to be described later.

The operation of the slips will now be quite clear. When the slips are required to release the pipe, the yoke 58 will be lifted by the hydraulic piston 56, the wedges 54 thus being lifted and at the same time retracted radially by the action of keys on the wedges sliding in keyways on the main bowl 50. When a pipe is to be gripped, piston 56 will be drawn downwardly in its cylinder thus pulling the yoke 58 down, pulling the wedges downwardly in their grooves and so radially inwardly under the action of their inclined keys and keyways to grip the pipe. Clearly the weight of the pipe acting on the friction members 53 will tend to pull the wedges downwardly, thus increasing gripping on the pipe in the normal manner of wedge slips.

Figure 7C:
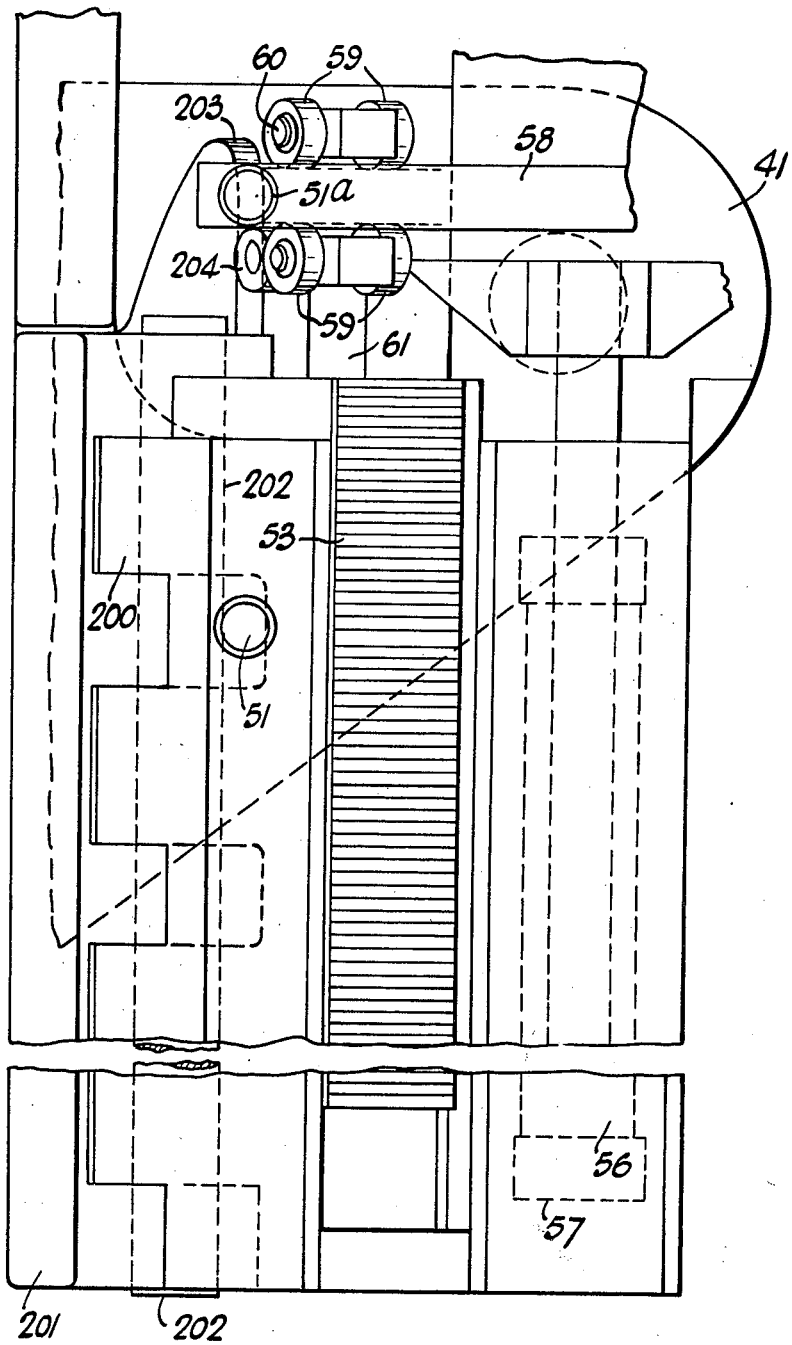
FIG. 7 is a plan view of a part of the slips mechanism.
FIG. 7A is a detail of the mechanism shown in FIG. 7 partially in section along the line VIIa—VIIa.
FIG. 7B is a plan view, FIG. 7C a side view, and FIG. 7D a front view, of part of the slips mechanism showing a latch mechanism therefor.
Figure 7D:
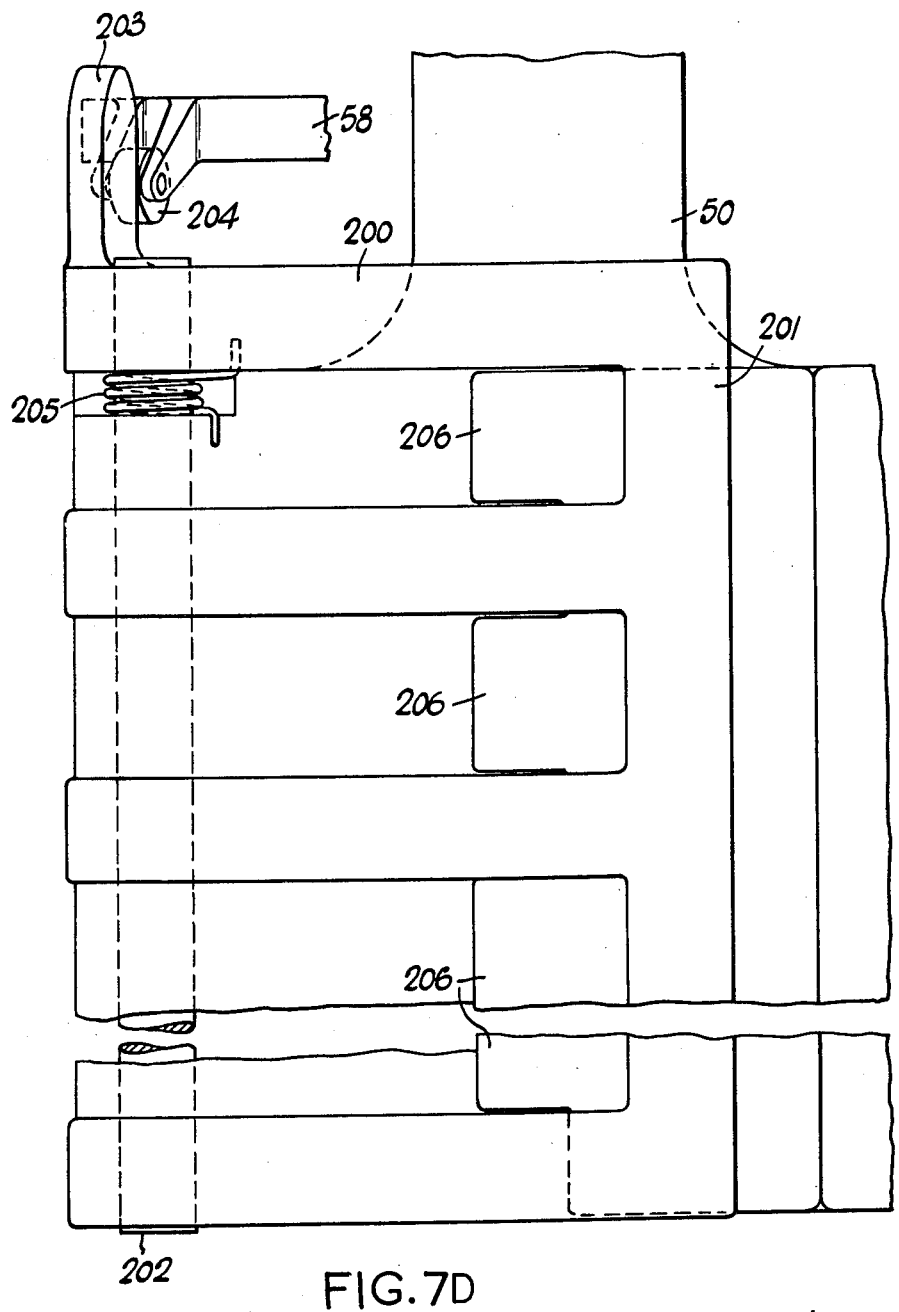

FIGS. 7B, 7C and 7D show a latch mechanism for the main bowl 50. FIG. 7B is a plan view showing the front halves joined together of the two half-sections of the slips mechanism, FIG. 7C is a side view and FIG. 7D is a front view. The latch mechanism comprises a latch member 200 having five fingers (only four are seen in FIG. 7D, one being in the cut-away portion) which are united at their outer ends by a crossbar 201. At the inner ends of the fingers the latch 200 is hinged on a hinge pin 202 to the main body 50 of the left hand half of the slips. The topmost finger of the latch carries a cam 203 which protrudes upwards alongside the yoke member 58 on which is carried a cam follower roller 204 which engages one vertical edge of the cam 203. The latch member 200 is urged away from the body of the slips bowl, into its open position shown in broken lines in FIG. 7B by means of a spring 205 (FIG. 7D) mounted on the hinge pin 202, and is moved against the action of the spring into its closed position by the action of roller 204 on cam 203 when the yoke member 58 descends to clamp the wedges 53 into engagement with the pipe. The crossbar 201 of the latch member 200 engages in the closed position over buttresses 206 formed on the outer face of the right-hand half of the slips bowl body 50 so as to link the two halves of the slips bowl and hold them together against the bursting strain introduced when the pipe string is gripped by the wedges. It will be understood that a latch mechanism as described would be provided at both sides of the slips bowl.

FIG. 10 shows how the slips are mounted on their respective trunnions immediately below the break-out mechanism which will now be described.

THE BREAK-OUT MECHANISM

The function of the break-out mechanism is to break the tool joint ready for unscrewing by the spinning-off mechanism. It is required to grip the two halves of a tool joint and unscrew the joint by a fraction of a turn. The tool joint will have been screwed up during the running in process to a standard tightness and may have become more tightly engaged through the torque exerted on the drill string for drilling purposes. The torque which the mechanism must exert on the tool joint, therefore, is considerable and may be greater for the break-out than is used for the tightening up action which it is required to exert during the running-in process when a new tool joint is assembled.

The mechanism is in effect divisible into four sections, two sections, an upper and a lower, being carried by each trunnion. One trunnion carries the main operating mechanism and pipe gripping elements adapted to engage around one side of a tool joint while the other trunnion carries pipe gripping elements for engagement around the other side of the tool joint, being operated by movements transferred from their opposite numbers. As in the case of the slips the parts carried on the respective trunnions are brought together when the trunnions come together, are located by interengaging dowels and dowel holes (not shown) and are then locked together by a latching device of any suitable character so as thereafter to function as a single unit. For an understanding of the operation of the mechanism it will be convenient to ignore the fact that it is constructed in two halves and regard it has a single unit. The arrangement is shown in FIG. 9 which shows a unit in plane view on each of the two platforms, the unit on platform 7 being in its inoperative condition and opened up so as to permit passage past it of the unit on platform 8 which is shown in an operative condition which it occupies at one time during the course of a break-out or a tightening-up operation. The operative part of the mechanism is shown in elevation in FIG. 10. The upper and lower sections of the units are arranged to grip the upper and lower parts of the tool joint respectively and the mechanism for effecting this gripping action is the same for each of the two sections. Looking therefore at the upper section of the mechanism carried by trunnion arm 41b, it comprises a main beam 65 and a locking arm 66, the extremities of which are linked by a hydraulic cylinder 67 pivoted at one end of the beam 65 and piston 67' pivoted to arm 66. This linkage functions to open out these arms to produce a locking action on the upper part of the tool joint. As will be seen from FIGS. 9, 9A, 9B, 9C and 10, the end of the beam 65 carries a semicylindrical shell 65b having apertures in its wall through which pass gripping dies 63. To the top of the shell 65b is attached a flange 65c. In the channel formed by the beam 65, shell 65b and flange 65c rides a semi-cylindrical collar 66a which is fixed to locking arm 66, and on the inner surface of which are formed cam surfaces 64. When the arm 66 and beam 65 are spread by the action of cylinder 67 as above described, the collar 66a turns about the shell 65b and the cam surfaces 64 urge the dies 63 radially inwards through their guiding apertures into engagement with the tool joint (FIG. 9B). An assembly similar to that just described is carried by trunnion arm 41a except that beam 65 and arm 66 are not required because, when the two parts of the mechanism come together (FIG. 9A), the ends of the semi-cylindrical body of the second assembly abut the ends of the collar 66a so that the turning movement of the latter is transmitted directly to the former. The lower section of the break-out mechanism, like the upper section, has a main beam 70 rigidly attached to the top of the slips bowl 50 and supported and held against turning by a pillar 69 mounted on trunnion arm 41b. It also comprises a locking arm 71 linked by the hydraulic cylinder 72 pivoted to beam 70 and piston 72′ pivoted to arm 71. This lower section engages the lower part of the tool joint by means of a locking action precisely similar to that of the upper section and need not be described in detail.

A latching device for the break-out mechanism is shown in FIGS. 10A and 10B. Collar 66a of one part of the upper section is provided with an outwardly projecting lug 220 which supports a hinge pin 221 on which is pivotally mounted a latch member 222 having a buckle aperture 222a adapted to engage over a boss 223 projecting outwardly from the mating collar of the other half of the upper section. The latch member 222 is yieldably urged to an open or released position by a spring 224, and is automatically closed over boss 223 by the action of a cam surface 225 formed on the periphery of fixed flange 65c of the upper section which engages an arm 226 fixed to latch member 222 and extending rearwardly therefrom at the opposite side of hinge pin 221. When collar 66a is rotated relative to shell 65b and flange 65c, the camming action of surface 225 and arm 226 either moves latch member 222 about pin 221 against the pressure of spring 224 to close the latch when cylinder 67 is expanded to move the gripping dies 63 into engagement with the tool joint (FIG. 9C), or permits the spring 224 to release the latch when collar 66a is moved in the opposite direction to release the gripping dies from the tool joint. Although FIG. 10A shows only the lug 220 on collar 71a and the boss 223 on the mating half collar of the lower section, it will be understood that a similar latch assembly is provided thereon, and that two more latches of the same construction are mounted in like manner on the upper and lower sections at the diametrically opposite side of the break-out mechanism.

The upper section of the break-out mechanism is rotatably mounted on the lower section by means of semi-cylindrical keys 65a and keyways 70a provided respectively on the lower surfaces of the semi-cylindrical shells of the upper section and the upper surfaces of the semi-cylindrical shells of the lower section.

The upper and lower sections are cross linked by a pair of hydraulic cylinders 73 and 74 and their associated pistons and when operated these devices swing the upper section relative to the lower section, the cylindrical shell 65b turning upon its lower counterpart with the key 65a moving in the keyway 70a, through an angle sufficient to break the joint (FIG. 9C). When pipe is being assembled for running-in these functions are, of course, reversed. The upper mechanism in FIG. 9 is shown in its operated condition. Arm 71 is shown spread from the beam 70 to lock the lower section on to the lower part of the tool joint. Arm 66 is spread from the beam 65 to lock the upper section on to the upper part of the tool joint, while the two beams 65 and 70 are shown swung out of line through an angle of approximately 45° which is sufficient to break the joint. In this position, of course, all the hydraulic cylinders are fully extended.

The sequence of operations through which the mechanism passes from the state shown in the lower part of FIG. 9 to the state shown in the upper part of FIG. 9 and back again will of course depend on whether the mechanism is being used to break out a joint (when pulling out) or to tighten a joint (when running in). The sequence when breaking a joint will be as follows:

(1a) Cylinder 67 is expanded to spread arm 66 from beam 65 clamping the upper section on to the tool joint.

(1b) Cylinder 72 is expanded to spread arm 71 from beam 70.

(These two operations may take place simultaneously (FIG. 9B).)

(2) Cylinders 73 and 74 are expanded to swing the upper section counter-clockwise to break the joint, the lower section being held rigid (upper part of FIG. 9 and FIG. 9C).

(3) Cylinders 67 and 72 are contracted to release the clamping action on the tool joint parts.

(4) Cylinders 73 and 74 are contracted to restore mechanism to the position shown in the lower part of FIG. 9.

For tightening up a joint the sequence is as follows:

(1) Cylinders 73 and 74 are expanded to swing the upper section counter-clockwise in relation to the lower section which is held rigid.

(2) Cylinders 67 and 72 are expanded to clamp the upper and lower sections on to their respective tool joint parts.

(3) Cylinders 73 and 74 are contracted to swing the mechanism back and tighten the joint.

(4) Cylinders 67 and 72 are contracted to release the upper and lower sections from the respective parts of the tool joint.

SPINNING-OFF-MECHANISM

Figure 2:
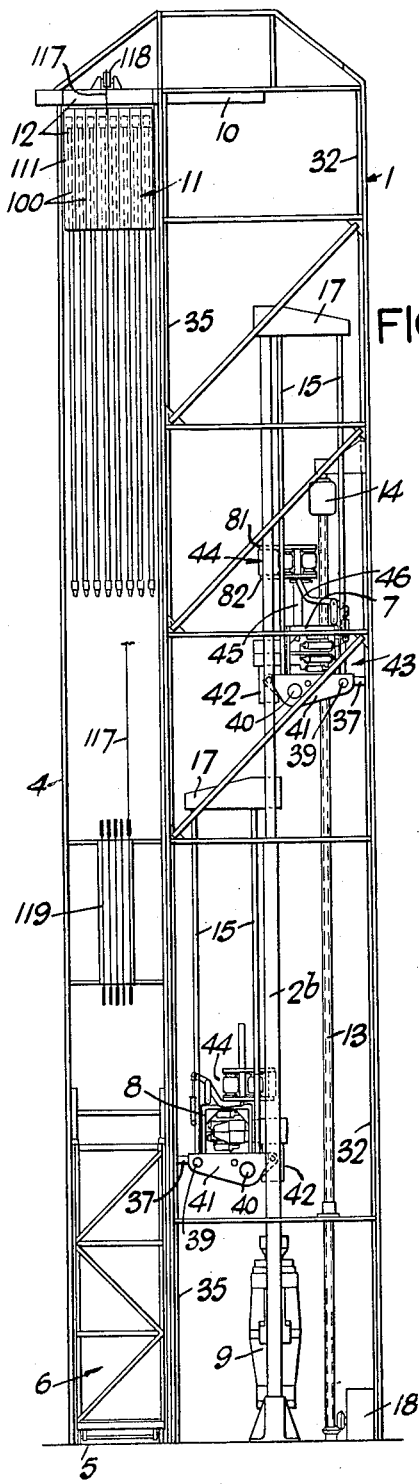
FIG. 2 is a side elevation of the complete rig.

The spinning-off mechanism 44 can be seen in general outline in FIG. 2 in two conditions of operation. It is shown in more detail in FIG. 10 in elevation and in FIG. 6 in plan. It is mounted above the lift platform and comprises a unit for gripping and spinning the pipe above the broken tool joint, and mechanism for raising and lowering this unit.

The main unit comprises a body in the form of two plates 81, 82, the forward ends of which form upper and lower jaws 81a, 82a, which carry between them rollers 85, 86 for engagement with the pipe. There is also provided a movable jaw 83 carrying a third roller 84. The moving jaw is operated by a hydraulic cylinder and piston 87 to close it on to the pipe at the appropriate time. An electric motor 88 is coupled to the roller 86 to drive it and so apply a rotational drive to the pipe. This motor must of course be reversible so that it can apply either clockwise or counter-clockwise rotation to the pipe for screwing in or unscrewing the pipe section. The whole unit is mounted on the vertical spindle 45 (previously referred to) on which it can swing through approximately a right angle from the position in which its jaws can engage a pipe of the drill string to a position over the platform where it is out of the way of the closed platform mechanisms of the other lift. This swinging motion is introduced by means of a further electric motor 90 which carries at its lower end a spur gear 91 which engages with a fixed segmental rack 91a (FIG. 10) mounted on the framework. Clearly this motor also must be reversible to provide for the two directions through which the unit is to be moved.

The whole of the unit above described is also movable vertically on the spindle 45 and its vertical movement is brought about by the double armed lever 46 fulcrumed at 94, FIG. 10 the outer end of which is operated on by the hydraulic cylinder 47.

The functioning of the spinning-off unit will now be clear. At the appropriate moment the unit is swung across and its jaws closed upon a pipe emerging from the bore hole just above the tool joint which has been engaged by the break-out mechanism. The break-out mechanism having operated, the motor 83 spins the pipe counter-clockwise to unscrew it, and as soon as it is clear the cylinder 47 is contracted to pull down the outer end of lever 46 and raise the spinning-off unit. This lifting movement is relatively rapid and of course is superimposed on the rising motion of the lift platform so that the disconnected pipe will be thrust upwards into a waiting hanger. The movement of the disconnected pipe during this manoeuvre may require a fixed guide member to be provided to steady the pipe and guide it towards the hanger with which it is to be engaged. Thereupon the spinning-off unit is swung aside by the motor 90 carrying with it the lower end of the disconnected pipe. At the same time the hanger carrying the pipe is moved off around the railway 10 and thus the dismantled pipe is got clear of the rising drill string, pulling of which is about to be taken over by the lower lift which is waiting for the next tool joint to arrive. Similarly the swinging sideways of the spinning-off unit serves to remove it from the central area of the rig altogether so that the lift with which it is associated may pass downwardly and allow the other lift to pass up carrying with it the drill string. During the passage downwards of the lift, the cylinder 47 is expanded to return the spinning mechanism to its lower position ready for the next operation.

Pipe racking mechanisms

THE HANGERS

Figure 4:
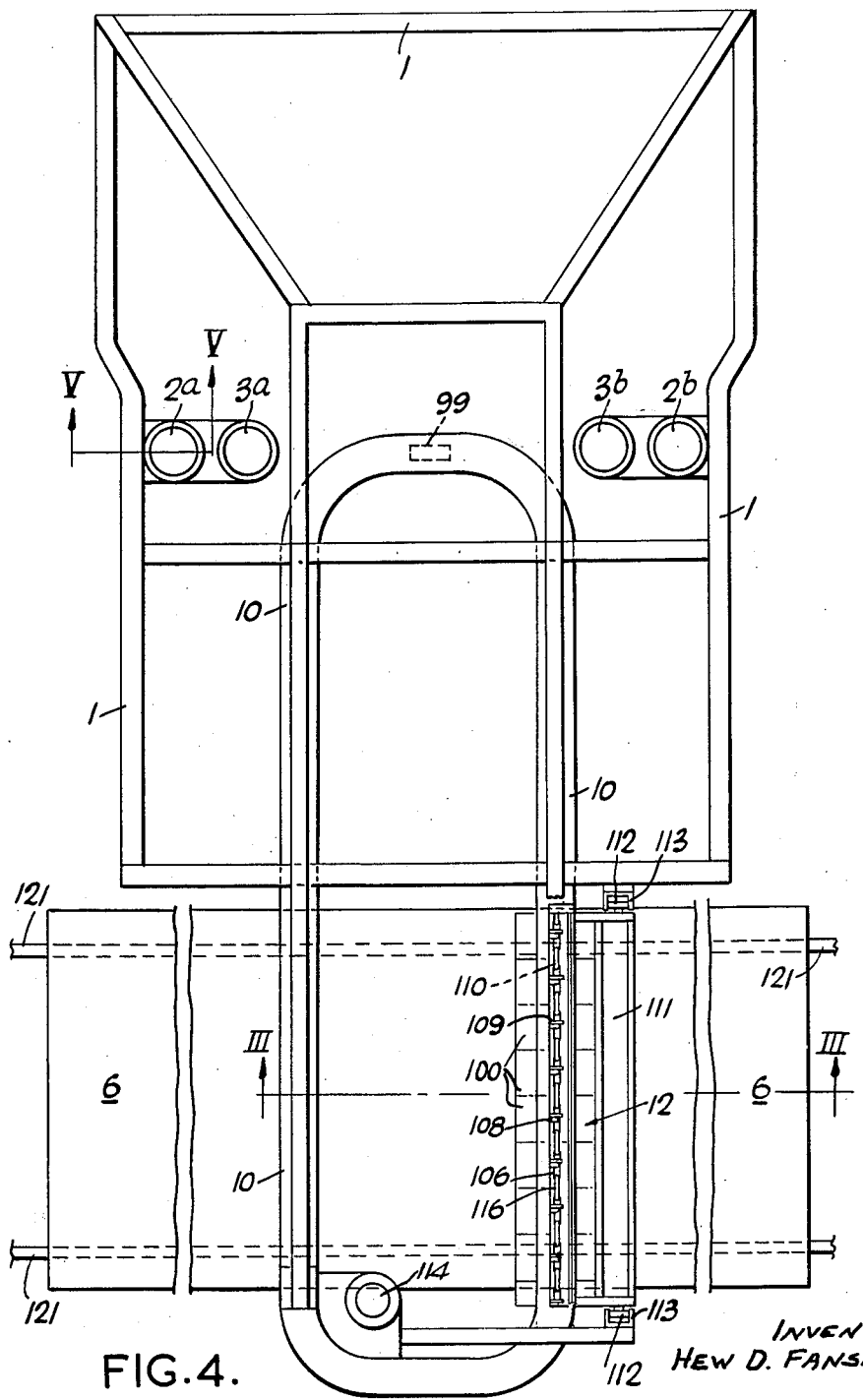
FIG. 4 is a plan view of the rig with some parts broken away showing the relative disposition of parts but omitting the lift platforms and mechanisms associated therewith.

A hanger comprises a tubular box of large enough internal cross section to receive the part of the tool joint carried on the upper end of a pipe to be thrust into it. The lower end of the tube may be flared in order to allow for some variation of the actual position of the upper end of a pipe when it reaches the hanger. The length of the hanger must moreover be enough to accommodate the variations in length of pipe which are encountered in practice. It will be appreciated that the spinning-off mechanism will at all times grip a pipe section at substantially the same distance above the tool joint so that when the pipe section is delivered into the charge of a hanger the lower end of the pipe will always be at substantially the same level. It follows that the position of the upper end of the pipe will vary according to the length of the pipe section. This is convenient, as will appear below, since it follows that the lower ends of the pipes as they hang in their hangers will lie in a common plane so that when they are lowered to the storage trolley 6 at the foot of the rig they will reach the floor of the trolley simultaneously and be set down together. Details of the hanger are shown in FIG. 3. The outer box structure 100 is shown broken away to reveal the gripping cams 101 on one side of the box. The cams are provided in pairs facing one another. They are pivoted as shown at 102 so that their inner ends may be pushed upwardly by the tool joint on the end of a pipe entering the hanger and will fall back against the pipe when the tool joint has passed so as to grip the pipe with a wedging action when the weight of the pipe begins to act downwardly on them. Their grip on the pipe may be made positive by serrating the cam faces or lining them with friction material. The outer ends of the cams are linked together by rod 103 which extends up through the casing to emerge at the top at 104. This provides for the release of the pipe by ancillary mechanisms at the appropriate times. A downward pressure on this rod end tilts the cams upwardly, so releasing them from the pipe. This rod will be actuated by a releasing bar when the pipes are lowered into the racking trolley at the bottom of the rig as pipes are returned to storage during the pulling-out operation. When running-in the rod 103 will ride under and so be pushed down by a cam 99 on the underside of rail 107 at the top of the rig. As shown in FIGS. 3 and 4, cam 99 is located immediately above the center line of the pipe string so that as the pipe is moved into line by the screwing-in mechanism (the spinning-off mechanism for pulling-out) the hanger and the pipe carried thereby are located above the drill string ready for the joint to be stabbed and tightened up by the spinning-off and break-out mechanisms operating in the reverse sequence of that employed for pulling-out.

The hanger is supported on an arm 105 which carries a pulley 106 which runs on the rail 107 which is part of the railway structure indicated generally by the reference numeral 10 (FIGS. 3 and 4).

The suspension arm 105 also carries an upstanding finger 108 by which the hanger is moved along the railway. This finger is engaged by fingers 109 carried on an endless moving chain 110 associated with the railway 10. The finger 108 is spring loaded into the driving position in which it engages the fingers 109. The purpose of this is to facilitate control of the hangers in their movements along the railway. The introduction of a positive stop checking the movement of hanger results in the spring loading of the finger being overridden so that the chain 110 may move on, leaving the hanger in the position in which it has been restrained. When pulling-out, the hangers are moved round by the fingers 109 on the chain 110 into position above the drill pipe string where each hanger is stopped in turn by engagement of the top 104 of its rod 103 with cam 99, the cam thus serving the double purpose of arresting the movement of the hanger and raising the cams 101 ready to receive the pipe. As mentioned above, when the movement of the hanger is arrested the finger 108 yields to allow the fingers 109 on the chain 110 to pass. At the appropriate time the spinning-off mechanism moves the disconnected pipe and the hanger into which it extends aside so that the rod 103 is freed from engagement with cam 99, whereupon the cams 101 engage the pipe and hold it, before the pipe is released by the spinning-off mechanism. FIGS. 3A, 3B, and 3C show a simple alternative mechanism for halting the hangers. A plunger 210 operated by a hydraulic cylinder or solenoid 212 under control of the main control equipment may be advanced into the path of the hanger arm 105 to arrest its motion and withdrawn when the hanger is allowed to move on. The plunger assembly is mounted on a bracket 211 secured to the overhead rail which carries the transport chain 110. As will be seen from FIGS. 3A and 3C two such plunger assemblies 210, 212 are provided mounted on the same bracket 211, one plunger for engaging one side of the arm 105 to arrest and position the hanger when pulling out, the other plunger for engaging the other side of the arm 105 to position the upper end of the hanger when running in. When running-in the spinning-off mechanism brings the pipe to the right position above the drill string to stab the joint. The appropriate plunger 210 serves to arrest the upper end of the hanger in the right position so that the pipe is held in line with the drill pipe string, ready to be added thereto by the spinning-off mechanism at the appropriate time.

A group of eight hangers nested together on the batcher is shown in plan in FIG. 4.

THE BATCHER

The batcher is shown in side elevation in FIG. 3 and in plan in FIG. 4. It is also indicated generally in FIG. 2. It consists merely of a framework 111 disposed in a vertical plane and is guided by wheels 112 running in vertical channel ways 113 so that it may be raised and lowered between the top and bottom of the rig. The channel ways 113 form part of the auxiliary structure indicated generally at 4 in FIG. 2. At its upper end the frame 111 carries a bracket 115 which carries a section of rail 116 which, when the batcher is in its topmost position fits into a gap in the rail 107 so as to complete the closed loop of railway 10. Hangers running on rail 107 can therefore be pushed by the chain 110 onto or off from this section of rail from or to the main railway. The batcher, as will be seen from FIG. 4, is just wide enough to accommodate eight and one-half hangers nested closely together side by side. Stops (not shown) are provided on the framework on each side of the batcher. These are operated by the control mechanism as follows. One of them holds up the flow of hangers past the batcher until a batch of eight has been collected in the batcher. The other operates when the batcher is full to hold up the flow of hangers to the batcher while the batcher lowers its batch of pipes to the storage trolley and return to the position shown. This is of course when pulling pipe. When running-in the operation is reversed. As will be seen in FIG. 2, the batcher is raised and lowered by a cable 117 which passes up to a pulley 118 at the top of the rig, over the pulley and down to a hydraulic jigger 119.

THE RAILWAY

This is the railway associated with the top of the rig for conveying pipe hangers to and from the batcher, and to and from the center of the rig. Its relationship to the rig is shown in FIG. 4. It will be seen to comprise a simple closed loop of substantially rectangular form. One short side of the rectangle lies across the center of the rig and merges via radiused corners into the two long sides which extend rearwardly right across the track on which runs the storage trolley 6, the loop being completed by the fourth side which constitutes the rearmost part of the rig. The nature of the railway has already been described in some detail with reference to FIG. 3. It consists of a channel-shaped way, the lower flange of which carries the rail proper 107, while the endless chain 110 previously referred to above is housed in a subsidiary channel above the rail. The chain is driven continuously by a driving motor 114 located at a rear corner of the rig (FIG. 4). As will be seen from the section of chain shown in detail within the batcher in FIGS. 3 and 4, drive fingers 109 are provided at closely spaced intervals on the chain. In addition it is to be understood that the railway carries a number of hangers considerably in excess of those actually in use at any one time. This is so that it may be certain that there will at all times be a reserve of empty hangers waiting to receive pipes as they emerge during the pulling-out operation and so that there will always be a reserve of empty hangers to fill the batcher before it descends to the pipe store and returns with a fresh load of pipes when running-in.

PIPE STORAGE

Figure 11:
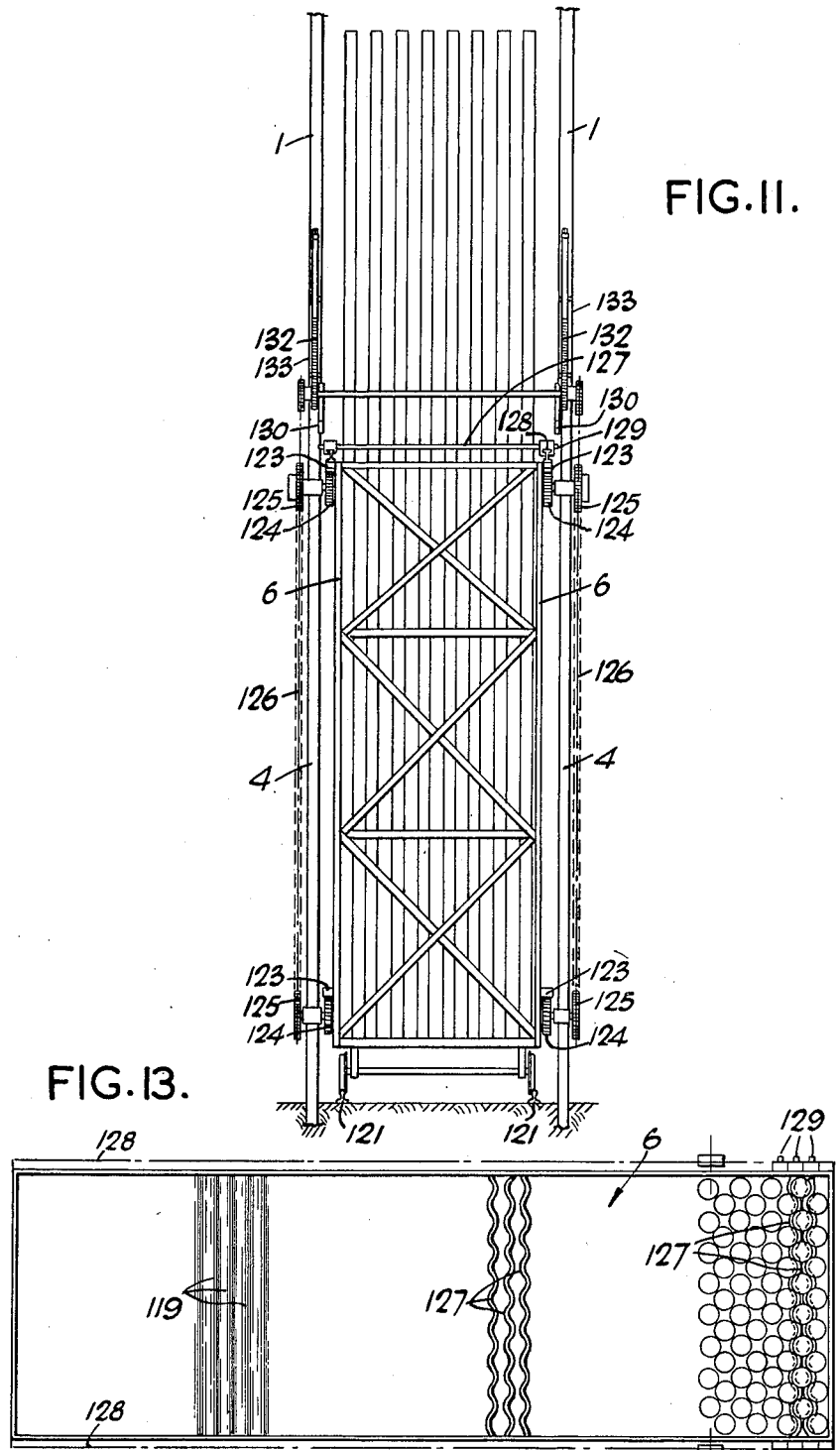
FIG. 11 is an end view of the racking trolley (i.e. a view from one side of the rig)

At the foot of the subsidiary structure there is provided the racking trolley 6, which runs on track 121 (FIG. 11). The trolley, on its track, can pass through framework 4 so as to pass directly under the batcher and is adapted to receive pipes standing in vertical attitude in closely packed form as seen in plan in FIG. 13. The pipes are delivered to the trolley in batches of eight, each batch constituting one row of the storage assembly. The floor of the trolley is preferably lined with wood or other relatively soft material so as to avoid damage to the pipe ends when they are lowered into it. Preferably also the floor of the trolley is profiled with corrugations as shown at 119 in the drawing to provide locations for the ends of the pipes. Successive rows of pipes are staggered crosswise of the trolley as shown so as to economise space. This staggering can readily be achieved by stopping the batch of hangers on the batcher alternately in each of the two positions required for the pipes to nest as shown.

So that successive rows of pipe may be set down in their correct positions, the trolley is inched forward in rhythm with the operation of the batcher. The mechanism for moving the trolley is indicated as comprising two racks 123 on each side of the trolley, one at the top and one at the bottom, engaging pinions 124 fixed on the framework. The top and bottom pinions are operated by chain wheels 125 linked by drive chains 126.

Figure 12:
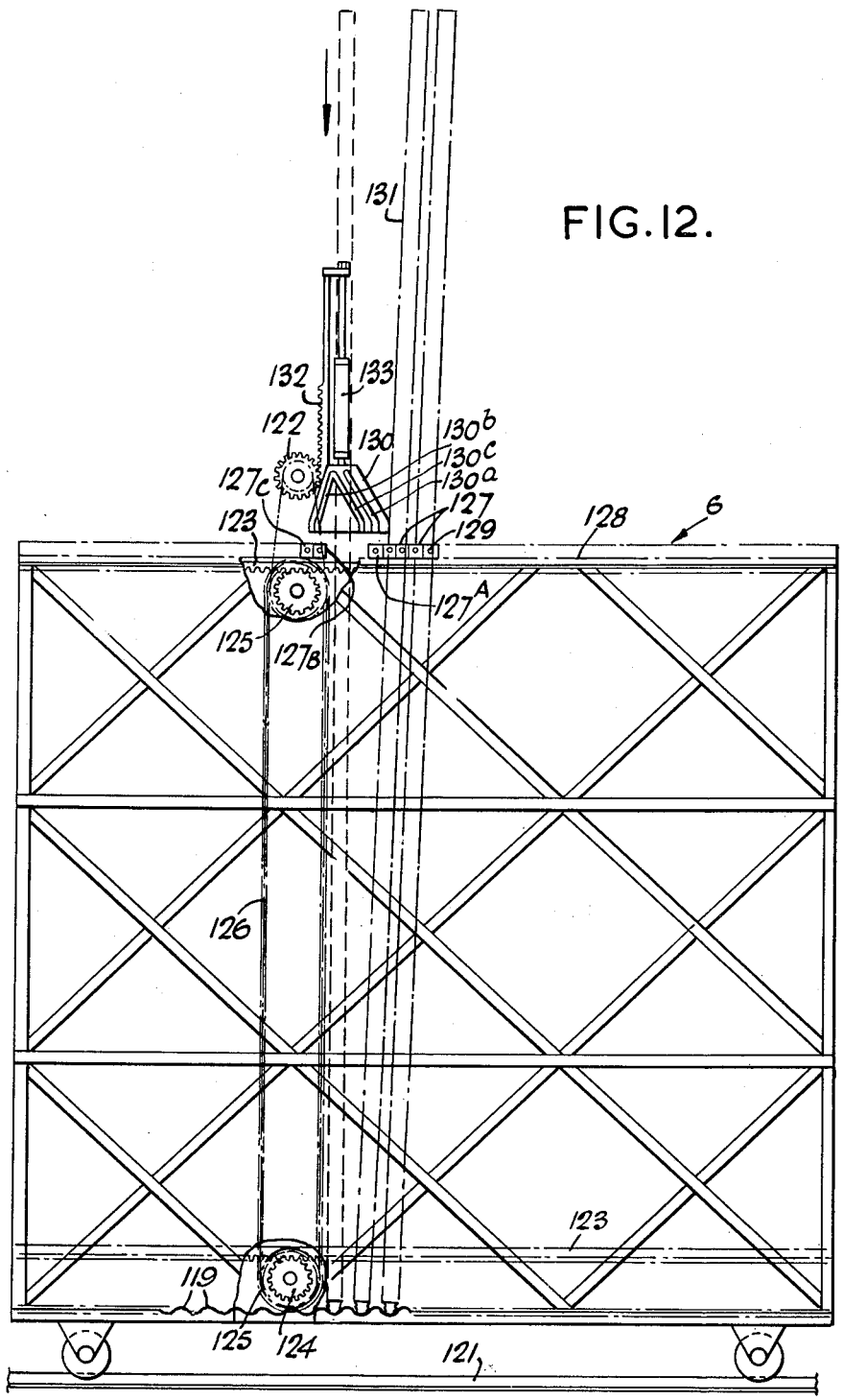
FIG. 12 is a view from the rear of the rig of the racking trolley and associated mechanisms.

It is of course preferred to stack the pipes as closely together as possible, but as each batch of pipes is lowered into the store the pipes are supported in hangers and it is necessary to provide clearance between the new batch of pipes and those already in the store to accommodate the extra cross section of the hangers. When the hangers are withdrawn, of course, this clearance is no longer required. In order to provide this clearance without waste of space therefore, it is arranged that each batch of pipes is set down in a vertical attitude and is "laid back" against the previously stored pipes so as to be well clear of the hangers when next they arrive. This action is achieved by providing pipe separators 127 between each row of pipes. These pipe separators are bars bent to a wave profile, as will be seen from the plan view in FIG. 13, so as to provide notches each of which may receive a pipe. These bars are supported at their two ends on rails 128 on the trolley sides and terminate in cam follower projections 129 (FIG. 12). The cam followers 129 are operated on by a cam 130 which is arranged to operate in rhythm with the trolley-moving rack and the batcher in the following way. Assuming that pipe is being loaded into the trolley and that the pipe shown at 131 is in the row last deposited, the pipe separator 127A will lie against it and separator 127B will be some distance away from it. The descending pipes will descend vertically between the two separators 127A and 127B. The cam 130 then descends and engages in its right-hand groove 130a the cam follower on separator 127A and moves it to the left, as seen in the drawing, thus bringing the separator into contact with the newly-arrived pipes. Simultaneously the cam follower on separator 127B will be engaged by the left-hand branch 130b of the inverted V shaped groove of cam 130 and will be moved to the right, as seen in the drawing, so that separator 127B is brought into contact with the newly arrived pipes. The pipes are thus held between the two separators 127A and 127B. When the hangers have been withdrawn, the cam 130 moves upwardly again, the cam follower on separator 127A returning down the right-hand straight groove 130a of the cam while the cam follower on pipe separator 127B follows the right-hand leg 130c of the V shaped cam groove so that the two separators 127A and 127B will in fact move together towards the right and lay the pipes back parallel to those already stored. The vertical reciprocating motion of the cam 130 produced by cylinder 133 in common with the vertical movement of racks 132 which operate upon the wheels 122, which drive the wheels 125 through a reversible ratchet, to inch the trolley along so that the trolley is automatically positioned ready to receive the next row of pipes, and the cam followers on pipe separator 127B and the next in sequence 127C will be positioned under the appropriate grooves of cam 130 for the next operation to take place. Clearly these operations will take place in reverse when pipe is being unloaded and supplied to the rig for running-in. In order that the trolley 6 shall move in the proper direction the drive between wheels 125 and pinions 124 is in the form of a ratchet which is reversible so as to provide reverse movement when running in from that required when pulling out.

The control equipment

GENERAL

The control equipment is required to co-ordinate all the operations of the rig and can be broken down into main control items and subsidiary control items. For example, the reversal of the rams from lifting to lowering and vice versa during pulling-out and running-in operations constitute items in an overall cycle of operation which involves the main hydraulic power unit. Co-ordinated with these items are the successive operations carried out by the break-out mechanism, the slips wedges, the spinning-off mechanism and the hangers, each of which involves control of a minor cycle of operations which must be co-ordinated in itself as well as being fitted into the main cycle.

In this specification no attempt has been made to describe in detail the various sensing devices which must be employed to co-ordinate the movements of the equipment. They may indeed take a variety of forms such as microswitches arranged to be actuated mechanically by the event it is required to sense and arranged when actuated to energise an electrically operated hydraulic control valve. In some circumstances, however, as will appear, the controller element is an electric motor, in which case of course the control switch can operate, if necessary, through a relay to complete the circuit of the motor.

It will be convenient to consider the main operating cycle of the two lifts and the control equipment therefor separately from the control of the minor cycles in which the subsidiary mechanisms operate, the co-ordination of the minor cycles within themselves and with one another being discussed later.

THE MAIN LIFT CYCLE

It happens that whether the rig is pulling-out a pipe string or running-in the string, the control equipment has virtually the same task to perform, the sequence of events when running in being the direct reverse of the sequence when pulling out. This task concerns in effect only the unladen lift which is either returning to the bottom of its stroke to take a new pull or rising to the top of the rig, unladen ready to lower the string by another pipe length. In either event the lift which is carrying the load either up or down is subject to a steady application of power or a steadily controlled relaxation, and no variations are required in its operation until the other lift takes over the load and what was the laden lift becomes the unladen lift. Accordingly the following description given with reference to FIG. 14 will consider the control exercised upon the unladen lift and will deal first with the process of pulling out.

As soon as a rising lift is relieved of its load as it nears the top of its stroke it becomes the unladen lift and it must go through the following cycle of operations:

(1) Continuing to move up at the speed of the pipe string.
(2) Slowing to rest.
(3) Accelerating downwardly to twice pipe speed.
(4) Running down at twice pipe speed.
(5) Slowing to rest.
(6) Waiting, at rest, at bottom of stroke.
(7) Accelerating up to pipe speed.

When operation (7) is complete, i.e. when the lift has reached pipe speed, it is caused to take the load by actuation of its pipe gripping and breakout mechanisms and it ceases to be the unladen lift. At this point the control apparatus transfers its attention to the other lift to carry it through the same cycle of operations. It follows that operation (7) on one lift gives place to operation (1) on the other, and since both of these operations employ the same setting of the lift control equipment they may be regarded as two parts of the same operation.

Looking now at FIG. 14 the four main rams are shown each with its three parts communicating with (A) The bottom end of the piston
(B) The inner bore, and
(C) The annulus between the piston and the outer cylinder.

These are described with reference to FIG. 5. The inner pair of rams 3a and 3b have their various ports connected together in pairs so that the two rams work in parallel, and similarly so have the outer pair of rams 2a and 2b. The various pairs of ports have been labelled in FIG. 14 as in the above list with the prefix "O" for the outer pair of rams and the prefix "I" for the inner pair. Elsewhere the prefix "L" has been used to indicate the port of a laden ram and the prefix "U" for an unladen ram. These prefixes, of course, refer in turn to the ports of either ram.

The changeover between the two pairs of rams is effected by a changeover valve designated generally at 150. It is operated by a hydraulic servo-cylinder 151 controlled by a pilot valve 152 operated electrically under control of the contacts 153a, 153b at the appropriate time in the operating cycle as will hereinafter appear. The valve has three sections, 150a, 150b and 150c, connected to the pairs of ports OB, IB, OA, IA, and OC, IC respectively. For simplicity of explanation the arrangement to be described provides for only two degrees of loading, light and heavy, not employing the multiple-cylinder rams to provide six loadings as above suggested. Consequently the ports C are used exclusively for control of the unladen lift. The light and heavy loadings are provided for by selective use of the two sets of ports A and B for the heavy and light loadings respectively.

Selection between light and heavy loads is carried out by valve 155 in its central and left-hand positions respectively. In its right-hand position this valve prepares the circuit for running-in pipe in place of pulling and for this changeover it is also necessary to change valve 156. These two valves are, of course, operable as circumstances demand and not in rhythm with the cycle of lift operations above set out.

The hydraulic system is a closed circuit system and destinations marked "T" indicate connections to the supply tank. Two pump supplies are provided, one designated MP is the pump system supplying the main operating flow to the loaded rams operating the lifts. The other designated CP is a constant pressure supply and is employed for control operations of the unladen rams.

Valve 157 is the main sequencing valve which controls the rhythm of the control system to accelerate and decelerate the unladen lift rams in accordance with the regime above stated. The unladen lift is driven by the CP supply operating through the B ports of the respective rams to raise the unladen lift in the first phase of the unladen lift control sequence when pulling pipe. When running in pipe the main pump system is used to raise the unladen lift at high speed. At other times the unladen lift falls under its own weight under control of a variable choke 158a or 158b (according to whether it is running in or pulling out respectively). In addition, at certain times the CP supply is used, operating through ports C and therefore downwardly, to accelerate the descending lift to its downward speed. All these different requirements are met at the times when they arise by the operation of the sequence valve 157, the actions of which are given their appropriate significance according to whether pipe is being run in or pulled out by suitable setting of valve 156.

Now assume that pipe is being pulled and that a heavy load is involved so that valve 155 is in its left hand position. The main pulling effort will be exerted then by connection of the main pump supply through valves 155b and 150b to the A ports of either the inner or the outer pair of rams according to the position of the changeover valve 150. This provides the main lifting force and pulls the pipe string. Assume that IA is operative, then OA will be connected to tank so that the outer rams can contract to lower the respective lift. It follows that OB is coupled to UB and IC to LC. The operation of the system when the next tool joint is sensed and the functions of the lifts are to be reversed will now be traced. It is convenient to start from the point where the changeover valve 150 operates. This is brought about by operation of contact 153a which is operated by a signal from the slips carried by the other lift when they have operated to grip the pipe. Main pressure supply to IA is then cut off and IB is connected to UB and IC to UC. It is the inner pair of rams in which we are now interested since they are operating the unladen lift.

At this point CP is connected through 156a and 157a (position 1) to UB, and this pressure maintains the inner lift rising at the speed of the string. This covers the period while the gripping mechanisms associated with that lift are releasing the string. UC is meanwhile connected to tank through 157b (position 1) and 156c. Sequence switch 157 then moves to position 2. In this position CP is still connected to UB and UC is connected to tank. The rams enter the buffers at the top of their stroke and are arrested.

Sequence switch 157 then moves to position 3. In this position UB is connected through 157a and 156b and through variable choke 158B to tank so that the inner rams IB can start to fall. UC is still connected to tank.

Sequence switch then moves to position 4. In this position UC is connected through 157b and 156c to CP and this provides downward boost to accelerate the inner lift downwards.

When the lift nears the bottom CP is cut off from UC by sequence switch 157 moving to position 5 leaving UB still connected to tank through 156b and 158b.

The inner lift comes to rest and sequence switch moves to position 6. In this position UC is still connected to tank but UB is cut off at 157a. The system waits in this condition unitil the next pipe joint is sensed, whereupon sequence switch 157 moves to position 1 again, in which position CP is applied to UB and the lift is accelerated to the speed of the string and its gripping mechanism applies itself to the tool joint. Once the slips have taken their grip they supply a signal to operate the changeover valve 150 and thereafter the process is repeated with the outer lift in the role of unladen lift.

Inspection of the drawing will show that when running in the same cycle of operations takes place but with certain functions reversed so that the cycle of the unladen lift, starting where the other lift takes over near the bottom of stroke, is as follows:

(1) Continues to move downward, slightly exceeding pipe speed so that the slip wedges can be raised.
(2) Decelerates to rest.
(3) Accelerated to twice pipe speed upwards (using main pumps).
(4) Runs at twice pipe speed.
(5) Slows to rest.
(6) Waits for next pipe.
(7) Accelerates downward to pipe speed and takes over.

It will be seen that this is the same pattern of operations as was listed for pulling-out and in the same way operations (1) and (7) merge the one into the other and may be regarded as part of the same operation. They both take place with the sequence switch 157 in position 1 and could be regarded as operations 1a and 1b.

When running in the operative lift (i.e. the lift on which the string hangs) is supplying pressure fluid back to tank. The operative lift is therefore connected to tank through two power absorbing units (PAU). These may take any convenient form such, for example, as flow-restricting valves and radiators for dissipating the heat generated by the fluid flow.

The operations of the sequence switch 157 are brought about electrically by signals derived from a plurality of sensing devices (only two of which indicated as switches 159a, 159b are shown) suitably located on the rig. In order to avoid having relatively vulnerable switches exposed to the rigours of rig conditions the rig may be provided with remote indicating equipment to reproduce the movements of the lifts on a reduced scale in the control cabin which will normally be provided. Micro switches arranged on this simulator are then operated mechanically by the simulated movements of the lifts so as to take place at suitable times in relation to the positions and movements of these lifts. Naturally, allowance will have to be made in the settings of these switches for the time lag between operation of the switch and fulfilment of the operation to be controlled thereby and for the speed of travel of the lift at the time. It will probably be preferred to provide separate sets of switches for control of the running in and pulling out sequences, the appropriate set being brought into action at the respective times as will be readily understood.

It will also be appreciated that in the hydraulic system above described normal additions such as air accumulators and such like have been omitted since they form no part of the present invention. Additionally, in the control equipment above described as well as in the control of the subsidiary equipments yet to be described suitable interlocks and cutouts will be provided to ensure against operation of the various parts in the wrong order and against damage to the apparatus in the event of failure of any part of it to operate as intended.

THE LIFT MECHANISM

The operations of the lift mechanisms, i.e. the slips, the break-out tongs, the spin-off mechanism and mechanism for bringing together the two separable parts of the lift mechanisms, are so closely interwoven that it is best to consider them under one heading. Most of the operations involved are dependent one upon another and will be triggered off by the completion of the preceding operation. Since each operating circuit amounts to no more than a trigger operated by the appropriate event and a solenoid or other actuating device energised by the trigger, it is not necessary to draw the circuits involved. What is important, however, is to set down the time sequence governing the various operations.

In the following table the sequence is given for the pulling out process, time progressing downwardly, the events in the column labelled "operation" to the right of the table overlapping with those written at the same level in the column similarly labelled at the left of the table. The arrows indicate that the event at the tip of the arrow is triggered by the event at the tail of the arrow or by the successful completion of the earlier event.

PULLING OUT

| Primary event | | Operation | Actuating device | Operation | Actuating device |
| --- | --- | --- | --- | --- | --- |
| Lifts pass (relevant lift going down) | → | Trunnion arms 41 close ↓ Block halves latch together | 48 | | |
| Lift mechanism moving with tool joint (going up) | → | Slip wedges actuate | 56, 57 → | Slips on other lift disengage | |
| | | Break-out mechanism locks on ↓ | 67, 72 | Spin-off mechanism swings in ↓ | 90, 91 |
| | | Break-out mechanism actuates ↓ | 73, 74 | Spin-off mechanism clamps ↓ | 87 |
| | | Break-out mechanism unlocks ↓ | 67, 72 | Spin-off motor starts ↓ | 88 |
| | | Break-out mechanism retracts | 73, 74 | Spin-off motor stops and mechanism lifts | 88, 47 |
| Lift nears top of stroke | → | Spin-off mechanism swings aside | 90, 91 → | Hanger moves with pipe | |
| Slips on other lift engage | → | Slip wedges withdraw | 56, 57 | | |
| Lift reaches top of travel | → | Spin-off mechanism releases pipe | 87 | Block halves unlatch ↓ Trunnion arms separate | 48 |

From the above it will be seen that the trunnion arms 41 can start to close upon one another just so soon as the platforms have passed one another, since the pipe and tool joints can pass between them. They are therefore closed and latched together on the downward journey so as to be ready and waiting for the next tool joint to reach the bottom of the lift stroke. The timing of the operations of the spinning-off mechanism in relation to the break-out mechanism is not critical; the spinning-off will not take place until the joint has been broken, but it is preferred to have the mechanism ready to spin the pipe just so soon as it is free.

Clearly the "primary events" listed in the left hand column can be signalled from the main rig or, if such is provided, from the simulator in the control cabin.

When running-in pipe the sequence is as follows:

(b) The spinning-off mechanism swings aside and simultaneously the hanger is moved so that the pipe is maintained substantially vertical.
(c) The spinning-off mechanism releases the pipe.
(d) The hanger is moved on by the chain 110.
(e) Stop device intercepts a hanger on the far side of the batcher in the direction of entry of the laden hangers into the batcher.
(f) The batcher is filled.
(g) Stop device intercepts next approaching hanger on entry side of batcher.
(h) Batcher descends with laden hangers.
(i) Pipes are released from hangers in trolley.
(j) Batcher ascends with empty hangers.
(k) Stop device remote from empty side of batcher releases and empty hangers move out.

RUNNING IN

| Primary event | Operation | Actuating device | Operation | Actuating device |
|---|---|---|---|---|
| Lifts pass (relevant lift going up) | → Trunnion arms 41 close ↓ Block halves latch | 48 | | |
| Lift mechanism moving with tool joint (going down) | → Slip wedges actuate | 56, 57 → | Slips on other lift disengage | |
| | | | Spin-off mechanism clamps pipe ↓ | 87 |
| | Hanger moves with pipe | ← | Spin-off mechanism swings in ↓ | 90, 91 |
| | | | Spin-off motor starts ↓ | 88 |
| | Break-out mechanism separates | 73, 74 | Spin-off mechanism lowers | 47 |
| | Break-out mechanism locks on ↓ | ← 67, 72 → | Spin-off motor stops | 88 |
| | Break-out mechanism closes ↓ | 73, 74 | Spin-off mechanism swings aside | 90, 91 |
| | Break-out mechanism unlocks | 67, 72 | | |
| Slips on other lift engage | → Slip wedges withdraw | 56, 57 | | |
| Lift reaches bottom of stroke | → Block halves unlatch ↓ Trunnion arms separate | 48 | | |

It will be seen that this is virtually a direct reversal of the operations when pulling-out, except that the spining-off mechanism must actuate before the break-out mechanism, and the individual operations of the break-out mechanism are transposed to provide a tightening up action plate of a break-out action.

A separate cycle of operations controls the batcher 111 and the movements of the hangers on the rail 107. It will be remembered that when pulling-out, a hanger must be held over the pipe axis ready to receive a disconnected pipe and must move aside in step with the swinging aside of the spinning-off mechanism. Thereafter it must be carried to the batcher, and when the latter is full further supplies must be held up while the batcher lift deposits its load in the trolley and returns. The restrained hangers are then carried into the batcher.

When running-in pipe the batcher is required to descend, pick up a batch of pipes, rise to the top, and then the pipes must be moved off to a location adjacent the pipe axis so as to be within reach of the spinning-off mechanism when it requires a new pipe for addition to the string. At this point the top of the pipe, i.e. the hanger, is required to move towards and into the string axis in step with the spinning-on mechanism, there to wait until the pipe has been lowered and, when the pipe is free of the hanger the latter can move on towards the batcher ready to pick up another load. The empty hangers will, of course, be required to wait while the batcher makes its round trip to collect a new batch of pipes from the trolley, and will then move in to refill the batcher.

The cycle when pulling out is as follows:

(a) A hanger waiting over the pipe string axis receives a pipe.

(l) Stop device remote from entry side of batcher intercepts first laden hanger.

This completes the cycle except that at the foot of the rig the cam 130 and rack 132 are operated to lay back the batch of pipes, to prepare to engage a new pair of pipe separators and to rack the trolley along to the next pipe location.

The cycle when running in will be seen to be a straightforward reversal of the above, with the conveyor chain 110 travelling, of course, in the reverse direction. The only modifications will be that the ratchet by which the trolley is operated must be reversed and the cams by which the pipes are retained in the hangers will not need to be operated at the foot of the rig since the pipes must be gripped here and not released, while at the top of the rig these cams must be operated to release the pipe as the spinning-off mechanism lowers, so that the pipe may be lowered to join the string.

DRILLING

The use of the rig when drilling requires little explanation. For drilling either lift can be used, the swivel 14 being hoisted into position on the appropriate platform. Drilling mud is supplied through piping (not shown) in the normal way. The automatic control system is, of course, not required during this regime, the feed of the drill string and drilling pressing being controlled simply by controlling the outflow of hydraulic fluid from the rams of the lift in use.

ALTERNATIVE CONSTRUCTION

By way of further example an alternate form of rig is shown in FIGS. 15 and 16. In this rig two lifts are again used. As in the previous example they are powered by double-acting hydraulic rams. In this rig, however, the two lifts do not pass one another but cover between them the stroke necessary to free a single pipe section.

Figure 17:
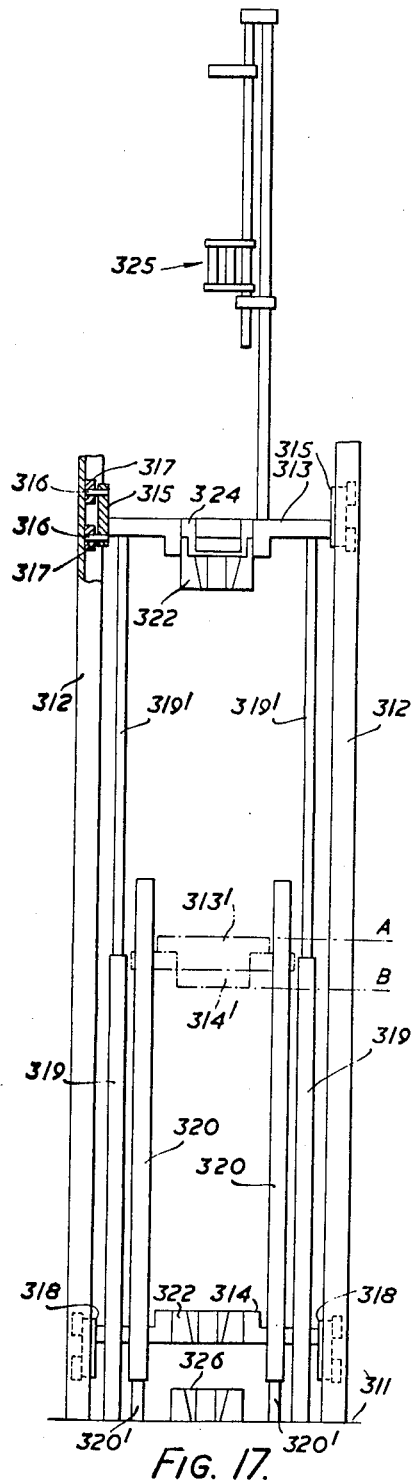
FIG. 17 is an elevation, mainly diagrammatic, of the arrangement of the lift platforms and their hydraulic rams.
Figure 19:
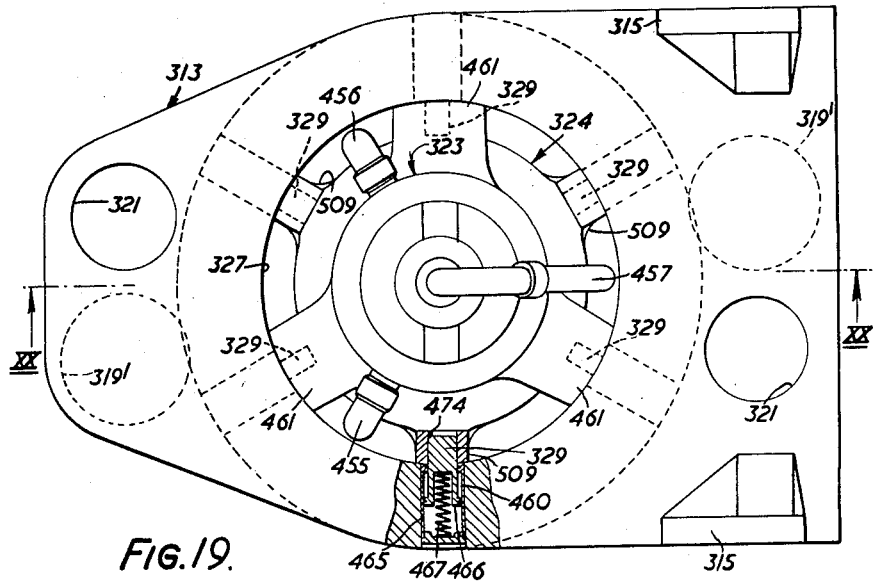
FIG. 19 is a plan view from above of the upper lift platform showing also a power swivel associated therewith.

The general arrangement of the rig is shown in FIGS. 15 and 16. In the ensuing description thereof reference will be made to other figures where necessary for explanation as the description proceeds. The equipment comprises a derrick structure 310 mounted on a working base platform and sub-structure 311 which rests on the ground and houses the conventional well head equipment. The derrick 310 supports a pair of vertical channel-section guides 312 for the two lift platforms 313 and 314. The derrick is extended above the guides 312 to form a relatively lightweight jib section 310a carrying a small hydraulic winch (not shown) for assembly purposes and handling casing. As better seen in FIGS. 19 and 20 the upper lift platform 313 is fixed to an upper pair of vertically extending carriages 315 which, as shown in the fragmentary section in FIG. 17, are provided with shafts 316 on which rollers 317 are mounted to run in the guides 312. Likewise, the lower lift platform 314 is fixed to a pair of lower carriages 318 (FIGS. 17 and 20) similarly mounted to run in the guides 312. Referring more particularly to FIG. 17 the upper lift platform 313 is carried on the upper ends of the pistons 319' of a pair of hydraulic rams the cylinders 319 of which are supported on the base 311 of the rig, while the lower lift platform 314 is fixed to the lower end portions of the cylinders 320 of another pair of hydraulic rams whose pistons 320' are supported on the base 311. In FIGS. 15 and 16 the pair of rams for the lower lift platform have been omitted for the sake of clarity. To allow for structural deflections the rams are mounted on ball ends. The inversion of the lower lift rams is for reasons of space economy and convenience of supply of hydraulic operating pressure. As shown in FIG. 19 the upper lift platform 313 is provided with a pair of apertures 321 enabling the hydraulic cylinders 329 of the lower lifts to rise through the upper lift platform. In FIG. 19 also the layout in plan of the four rams will be apparent from the indicated dispositions of the apertures 321 and of the pistons 319' shown in dotted outlines. The four rams form a narrow rectangle straddling the bore hole which is, of course, at the center, and the pairs of rams are diagonally opposed.

The two lifts 313 and 314 operate over different strokes one above the other with an overlap which enables the upper lift 313 to take over from the lower lift 314 during pulling out of pipe although the two lifts never pass one another. The length of the stroke of each lift is little more than half the length of a single pipe section. Their operating rams 319, 320 are accordingly provided with a stroke equal to half a drill pipe length plus an allowance for the lifts to run together during the take-over above mentioned, and also for an initial travel so that acceleration of a lift up to running speed can be obtained before gripping the drill pipe, and for a final travel for deceleration and stopping after releasing the drill pipe. FIGS. 15, 16 and 17 shows the upper lift 313 at the top of its stroke and the lower lift 314 near the bottom of its stroke. In FIG. 17 the lower lift 314 is shown in broken lines at 314' at the top of its stroke and the upper lift 313 is shown in broken lines at 313' near the bottom of its stroke and directly on top of the lower lift similarly as the two lifts are shown together in FIG. 20. The two lifts run together in the over-lapping regions of their strokes between the levels indicated at A and B in FIG. 17, during which the transfer of drill pipe string load from one to the other can take place.

Figure 20:
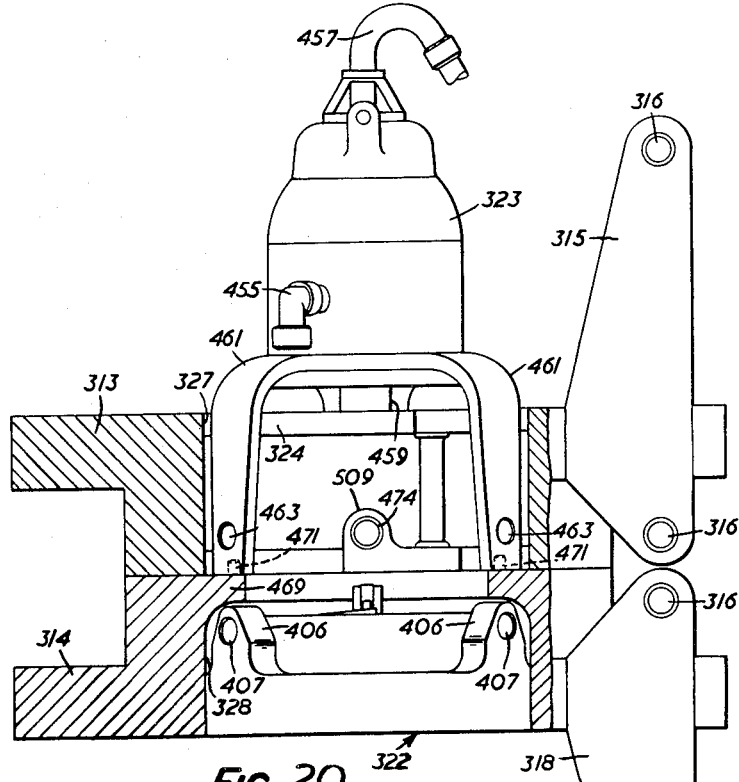
FIG. 20 is a side elevation partly in section taken along the line XX—XX of FIG. 19 showing the upper and lower lift platforms together.

With such a lift arrangement the pipe dismantling means can be carried by one of the lifts. Accordingly in the instant example the lower lift platform 314 carries only a slips mechanism (indicated generally at 322 in FIGS. 17 and 20) while the upper lift platform 313 carries a break-out mechanism (indicated generally at 324 in FIGS. 17 and 20) and a spin-off mechanism (indicated generally at 325 in FIGS. 15, 16, 17 and 27). For pulling out and running in pipe the upper lift platform 313 also carries a slips mechanism 322, as indicated in FIG. 17, but for drilling this slips mechanism is replaced by a power swivel. In FIGS. 19 and 20 the power swivel 323 is shown in position. These mechanisms will be described in more detail later but it may here be convenient to mention that since the lift mechanisms are not required to pass one another the slips and break-out mechanisms require no means of side entry for the pipe and accordingly are not constructed in two halves as was the case in the previous example described, but each of these mechanisms can be designed on the closed-circle principle and constructed as a single indivisible unit of generally annular form through which the drill pipe passes. As will be seen in FIG. 20 the lift platforms 313 and 314 have circular openings 327 and 328 respectively in which the mechanisms above mentioned are detachably mounted by means of hydraulically actuated locking pins 329 carried by the platforms. Ground slips 326 are provided centrally on the base 311 of the rig.

As shown in FIGS. 15 and 16 the rig includes means for storage of pipe lengths to one side of and clear of the derrick 310. The pipe lengths are stored horizontally and conveyed to and from the derrick by means of a pipe racking mechanism which includes a pipe transport arm 330, a racking arm structure indicated generally at 331 and a storage rack structure indicated generally at 332 in which the individual pipe lengths are stored horizontally. The transport arm 330 is carried on a horizontal pivot 333 fixed on the derrick 310 near the platform 311 so that the transport arm can swing in a vertical plane. By means of a hydraulic jack 334 attached between anchorage pivots 335 and 336 provided on the transport arm 330 and the base 311 respectively, the transport arm can be swung between a substantially upright position shown in FIG. 27 in which it can accept a pipe length from, or deliver a pipe length to, the upper part of the derrick, and a substantially horizontal position shown in FIGS. 15 and 16 in which the arm can deliver a pipe length to, or accept a pipe length from, the racking arm structure 331. The latter includes an upstanding arm 337 mounted on a horizontal pivot 338 on a base bracket 339 and an outer arm 340 carried by a horizontal pivot 341 on the upper end of arm 337. A hydraulic jack 342 attached between a ground anchorage pivot 343 and an anchorage pivot 344 on the arm 337 controls swinging movement of the arm 337 in a vertical plane between positions indicated by broken lines A and B in FIG. 15. A hydraulic jack 345 pivotably attached between a tail portion 346 of the outer arm 340 and the pivot 344 controls movement of the outer arm 340 in a vertical plane. The racking arm structure 331 is arranged to move single pipe lengths in either direction between a position shown in FIGS. 15 and 16 at which the outer arm 340 co-operates with the transport arm 330 for accepting a pipe length therefrom, or delivering a pipe length thereto, and the several positions in the rack structure 332 wherein the pipe lengths are stored. The rack structure 332 has open ends giving free access to the screw-threaded pipe ends for inspection purposes. These mechanisms will be described in more detail later.

Figures 17A, 17B:
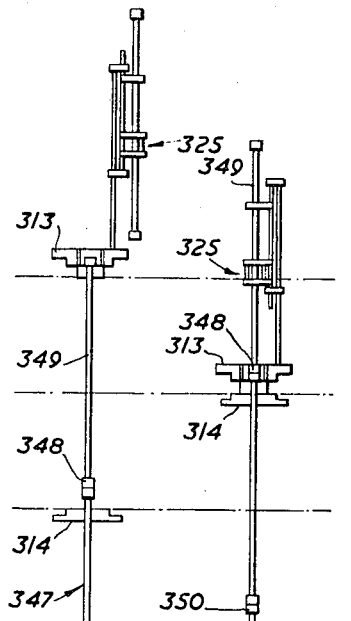
FIGS. 17A, 17B, 17C and 17D are diagrams illustrating the sequence of operations in pulling out pipe.
Figures 17C, 17D:
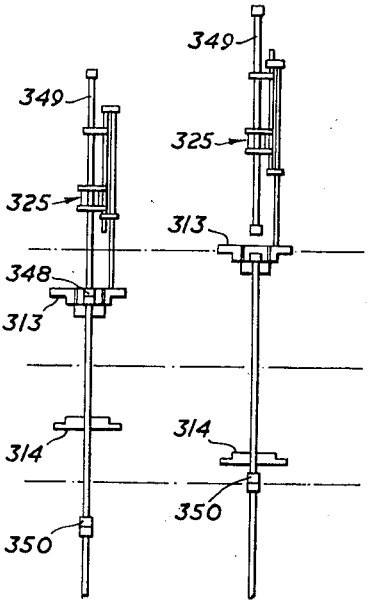
Figures 27, 28:
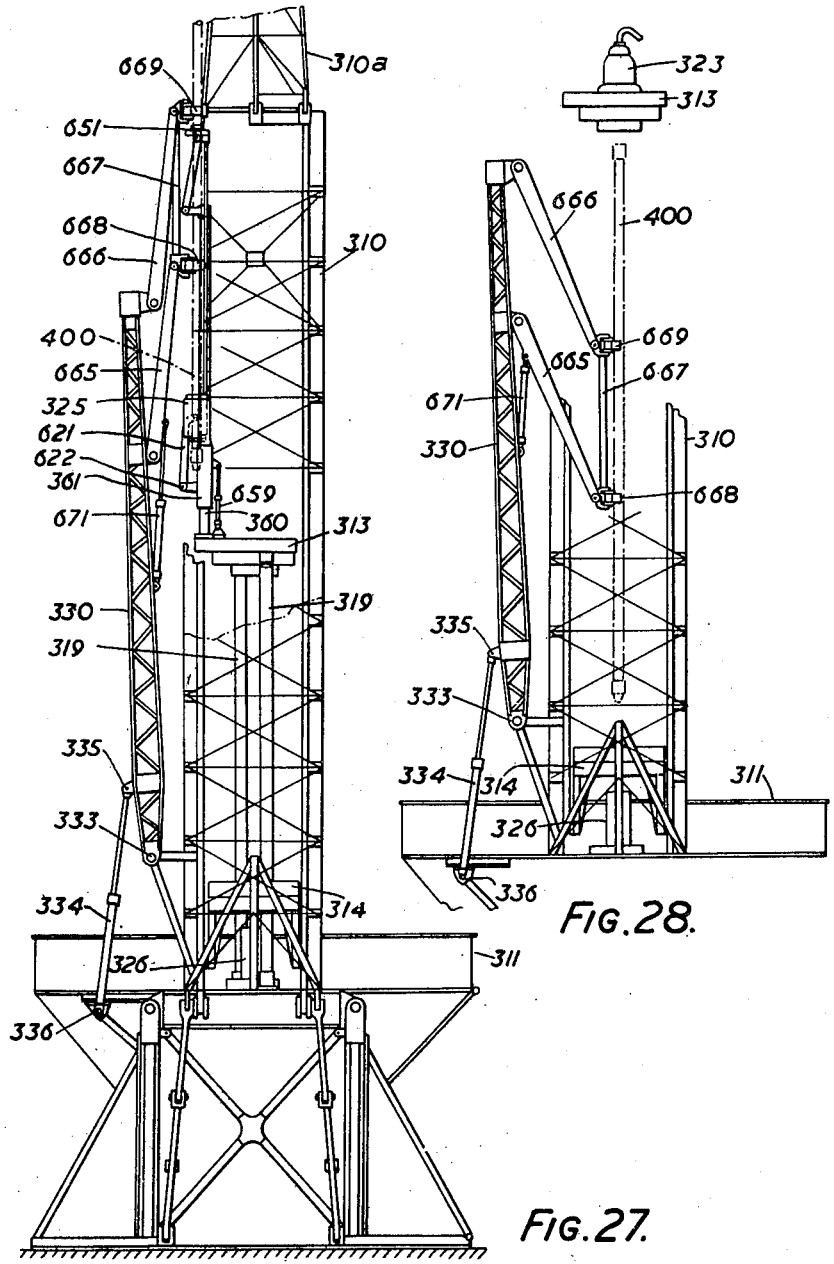
FIG. 27 is an elevation of part of the rig with some of the structure omitted and showing the transport arm in another operative position.
FIG. 28 is a side elevation of the transport arm in a further operative position.

The cycle of operations involved in pulling out and dismantling a pipe section is illustrated diagrammatically in FIGS. 17A, 17B, 17C and 17D which illustrate successive phases. In operation, the lifts run at higher velocity on their return strokes than when pulling. Suitable velocities may be 4 ft./sec. when pulling and 10 ft./sec. when returning. The sequence of operations is as follows. The drill string 347 is gripped in the slips mechanism in the lower lift 314 below the tool joint 348 (FIG. 17A). The upper lift 313 is at the top of its stroke, having just released the drill string. The spin-off mechanism 325 has moved aside before the upper lift starts its return stroke. The upper lift 313 returns to the bottom of its stroke (FIG. 17B) and waits while the lower lift 314 raises the drill string by approximately half a pipe length to meet the upper lift. The slips mechanism of the upper lift grips the pipe above the lower lift but immediately below the tool joint 348 (FIG. 17B). Both lifts rise together, over the over-lapping region A–B in FIG. 17, during which period both lift slips mechanisms are gripping the string. At the top of the stroke of the lower lifts its slips mechanism is released and the pulling taken over by the upper lift (FIG. 17B). The spin-off mechanism 325 is swung in to support the pipe section 349 above the tool joint 348. The upper lift 313 continues to raise the string 347 at a constant velocity and the lower lift 314 returns and waits at the bottom of its stroke in position ready for gripping the string below the following tool joint 350. In FIG. 17C the upper lift is still rising, pulling the drill string, and the lower lift is returning. While the upper lift is pulling, its break-out mechanism grips and breaks the tool joint 348, the pipe section 349 being steadied by the spin-off mechanism 325. While the upper lift 313 is still rising the spin-off mechanism completes the unscrewing of the pipe section 349 and lifts it clear of the upper lift platform, sufficiently to clear the following pipe (FIG. 17D). The upper lift reaches the top of its stroke, the spin-off mechanism moves the pipe section aside, still supporting it, and the lift cycle is repeated (FIG. 17A). The upper lift returning to the bottom of its stroke brings the spun-off section approximately half a pipe length down the rig, and when the upper lift is at the bottom of its stroke (as shown in FIG. 27) the pipe section is in position (see FIG. 27) for acceptance by the transport arm 330 which takes over the pipe section and swings it through 90° (see FIGS. 15 and 16) to the racking arm 340 which takes over and places the pipe section in the storage rack 332. Whilst this is taking place the transport arm 330 swings back in position (FIG. 27) ready to accept the next pipe section brought down on the upper lift. Also, after handing over the pipe section to the transport arm the spin-off mechanism on the rising upper lift is indexed back into position to support the next pipe section (FIG. 17B).

FIG. 18 is a timing diagram indicating the lift movements plotted against time in seconds for a sequence of two long pipe lengths 349a, 349b, two short pipe lengths 349c, 349d and one long pipe length 349e, this representing the worst combination of pipe lengths. It will be seen that the normal variation in length of pipe is accommodated without alteration of the stroke or pattern of motion of the lifts. FIGS. 18A and 18B are enlargements of the end portions of lift strokes encircled in the diagram of FIG. 18 and show the minimum waiting time. Each lift accelerates before gripping and decelerates after handing over the weight of the drill string so that one lift does all its maneuvering while the other is pulling. The motions of the tool joints are represented by straight lines showing that the drill string is pulled in one smooth continuous motion.

The operation of running in pipe is exactly the reverse of the pulling operation described, that is to say, the racking arm 340 selects a pipe section from the storage rack 332 and offers it to the transport arm 330 which in turn presents the pipe to the upper lift now in its lowest position shown in FIG. 27. The pipe section is carried by the spin-off mechanism on the upper lift to the top of its stroke and the spin-off mechanism swings the pipe section over to the center line of the drill string, lowers the pipe section to stab the thread, at the same time spinning on and allowing the break-out mechanism (now operating in reverse as a make-up mechanism) to tighten the joint to a predetermined torque. The lower lift takes over and continues to the end of its stroke.

For drilling the slips mechanism is removed from the upper lift and replaced by the power swivel 323. After drilling down to mid-way to meet the lower lift at the top of its stroke operation of the hydraulically actuated locking pins 329 in the upper lift permits the power swivel and break-out mechanism to release and transfer themselves to the lower lift to complete a drilling stroke until a new single is required to be added. To add a new single the lower lift is raised sufficiently to take the weight off the bit and the string is gripped in the ground slips 326. Circulation is stopped and the break-out mechanism breaks the joint between the pipe and the power swivel and the power swivel is then used to spin-off. The slips mechanism in the lower lift is released and this lift raised to meet the upper lift at the bottom of its stroke. The power swivel and break-out mechanism are transferred back to the upper lift, the lifts are fully separated and the new single introduced between them by the transport arm 330 to hold the single in a position (shown in FIG. 28 to be referred to later) where the power swivel can spin on and the break-out mechanism (now operating as a make-up mechanism) can tighten the joint. At this stage the upper lift is lowered sufficiently to spin the new single on to the top of the drill string. The break-out mechanism is lowered by the winch to the lower lift and finally makes up the pipe joint so that drilling can be resumed.

Component mechanisms of the rig will now be described in detail.

THE SLIPS MECHANISMS

Figure 21:
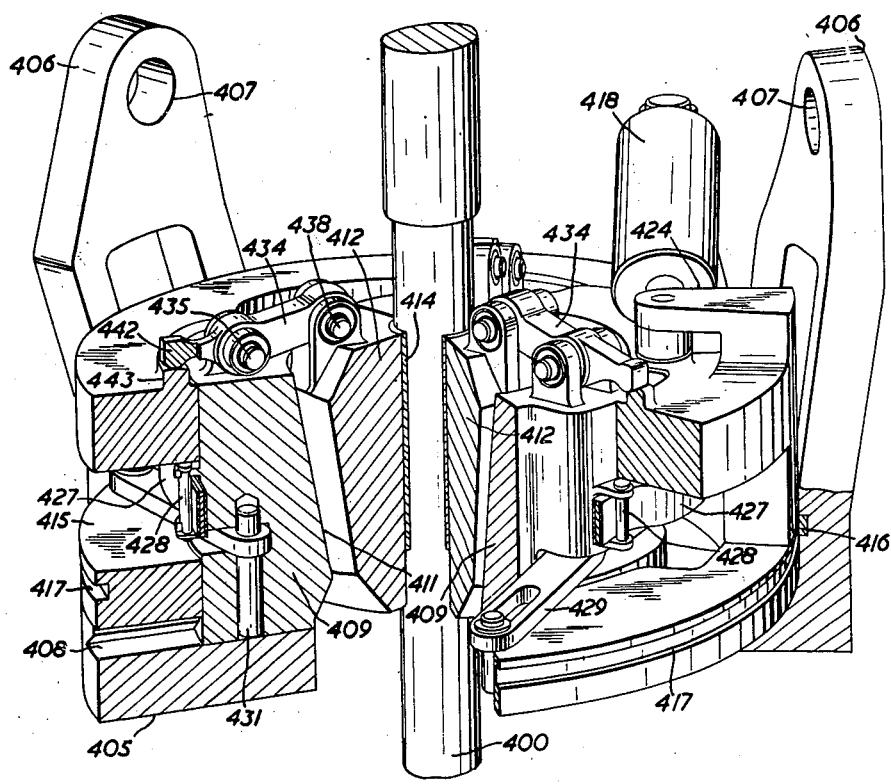
FIG. 21 is a perspective view of the slips mechanism with some parts broken away in section to show interior details.
Figure 22:
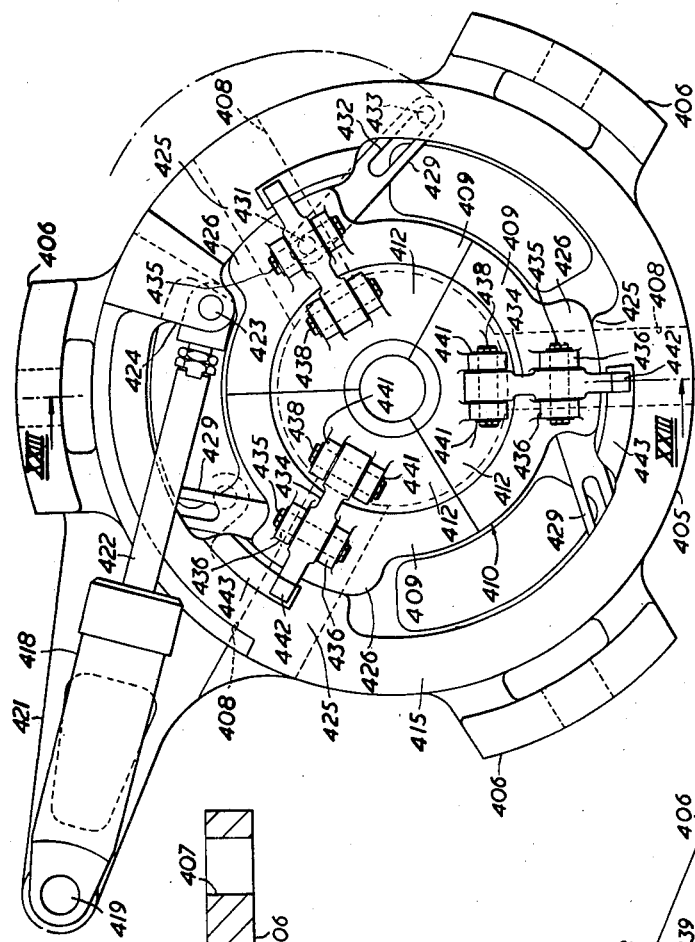
FIG. 22 is a plan view from above of the slips mechanism.
Figure 23:
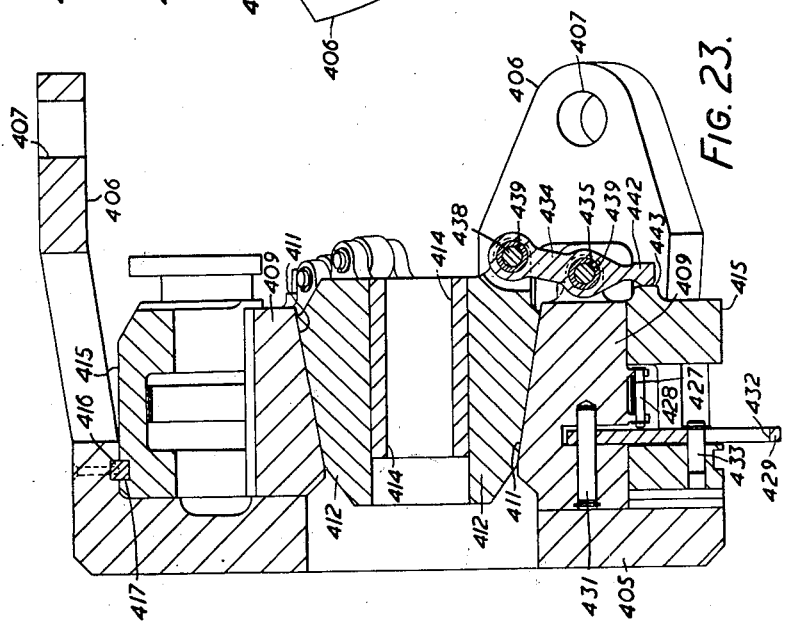
FIG. 23 is a section on the line XXIII—XXIII of FIG. 22.

Each slips mechanism 322 may be constructed as shown in FIGS. 21, 22 and 23. This construction is disclosed in an application of Richard Northam Knights, Serial No. 29,273, filed May 16, 1960, now Patent No. 3,029,488, dated April 17, 1962.

The mechanism comprises a circular base plate 405 having three upstanding lugs 406 equally spaced around its periphery, these arms having holes 407 in their upper ends for fastenings (locking pins 329 in FIG. 19) by means of which the slips mechanism may be attached to the lift platform 313 or 314. The base plate 405 has three equally spaced radial dovetail guideways 408 which slidably receive the three segmental elements 409 of a component 410 called the slip bowl. The latter is circular but divided into three elements on mating planes which subtend angles of 120° at the central axis of the mechanism. The slip bowl has a tapered inner surface 411 of frusto-conical form which is complementally engaged by wedges 412. One such wedge 412 is associated with each segmental element 409 of the slip bowl 410 and the three wedges, each being a segment with radial faces inclined at 120°, together may totally surround a pipe 400 passing centrally through the mechanism and engage said pipe by means of friction surfaces 414 of conventional form and material.

The elements of the slip bowl 410 arm outwardly contained by a confining ring 415 which turns on the base plate 405 and which is captively retained by three bearing segments 416 fixed to the respective arms 406, the bearing segments engaging a groove 417 formed in the periphery of the confining ring 415. The confining ring can be turned about the central axis by a fluid pressure operated jack whose cylinder 418 is pivotally secured at 419 to an arm 421 which is integral with the base plate 405 and whose piston rod 422 is pivotally secured at 423 to a lug 424 which is formed on the upper part of the confining ring 415. The interior of the confining ring 415 is formed with three equally spaced projections 425 while each element 409 of the slip bowl is formed with an external projection 426. When the external projections 426 lie in register with the internal projections 425 of the confining ring 415 the elements 409 of the slip bowl are held together in the operative position to enable the wedges 412 to engage the drill pipe, but when the confining ring 415 is rotated counter-clockwise with respect to FIGURE 22 by the jack 418, 422 the internal projections 425 lie in intervening relationship with respect to the external projections 426 of the slip bowl whereby the elements 409 are free to slide radially in their guideways 408 away from the central axis. The elements 409 are spring-loaded outwardly by means of an encircling spring 427 of strip form which is located by a retaining pin 428 on each element 409.

The elements 409 are arranged to be extended upon rotation of the confining ring 415 by mechanism now to be described. This mechanism consists of three links 429 each of which is joined at its inner end on a pivot pin 431 to the underside of an element 409. The axis of the pivot pin 431 lies in the bisecting plane between the inclined radial faces of the element 409. The outer portion of each link 429 has a longitudinal slot 432 while a pivot pin 433 which extends through the slot is fixed in the confining ring 415. In the position of the links 429 as shown in FIGURE 22 the pins 433 engage the outer ends of the slots 432 to form a rotational limit stop for the confining ring 415, on extension of the jack 418, 422. When the jack is contracted the confining ring 415 will turn in a counter-clockwise sense causing the pins 433 to ride up the slots 432 in the links 429 and simultaneously turning each of the latter about its corresponding pivotal joint 431 on an element 409. At the same time, each internal projection 425 is turning out of register with the external projection 426 on each element 409 of the slip bowl 410. Just before the point at which the projection 425 turns out of engagement with the projection 426, each link 429 lies in a generally radial direction with the pin 433 at the inner end of the slot 432 thereby acting through the link 429 to hold the element 409 towards the central axis against the resilient expansive force of the spring 427.

Upon continued rotation of the ring 415, each link 429 passes over top dead center, i.e. beyond the radial direction, allowing the elements to slide radially outwardly under the influence of the spring 427. The inner end of each slot 432 continues to bear against the pin 433, and the radial movement of each element 409 is therefore governed by the turning movement of the link 429 caused by rotation of the confining ring 415. At the end of the jack travel, i.e. when fully contracted, the confining ring 415 will have turned to allow the elements 409 to expand fully, thus leaving adequate clearance for each tool joint which is of larger diameter than the drill pipe to pass axially through the elements 409. The motions are reversed upon extension of the jack 418, 422 with the confining ring 415 acting through the links 429 to slide the elements 409 radially inwards.

The links 429 hold the elements 409 closed just before the inward projections 425 of the confining ring turn to engage the outward projections 426 on the elements.

Each wedge 412 is connected to its associated segmental element 409 by a lever 434 whose fulcrum pin 435 is carried at opposite ends in lugs 436 which extend upwardly from the element 409. The inner end of the lever has a pivot pin 438 whose ends are secured in a pair of lugs 441 which are upstanding from the wedge 412. The outer arm 442 of the lever co-operates with a cam track 443 which is formed on the upper surface of the confining ring 415 to apply a downward force to the wedge 412 as the confining ring 415 is rotated towards its ultimate position in the clockwise direction.

The fulcrum pin 435 and pivot pin 438 are mounted in the lever 434, and preferably the lugs 436 and 441 also, by rubber bushes 439 which are preloaded to provide a resiliently acting lifting force on each wedge 412. The bushes 439 moreover accommodate a small degree of overtravel imparted to the levers 434 by the cams 443 to ensure positive engagement of the wedges with the drill pipe. The wedges are formed in known manner such that when engaged with the drill pipe, the grip on the pipe will increase as the downward frictional pull exerted by the pipe on the wedges increases.

When the wedges 412 no longer support the weight of the drill string they are able by virtue of the wedge angle to relax their grip sufficiently to enable the confining ring to be turned out of engagement. Thereupon the wedges rise under the spring load of the rubber bushes 439 to disengage the pipe entirely, though not sufficiently to allow the tool joint to pass through. The radial movement of the elements 409 of the slip bowl with their associated wedges 412 serves the latter purpose.

THE BREAK-OUT MECHANISM

Figure 24:
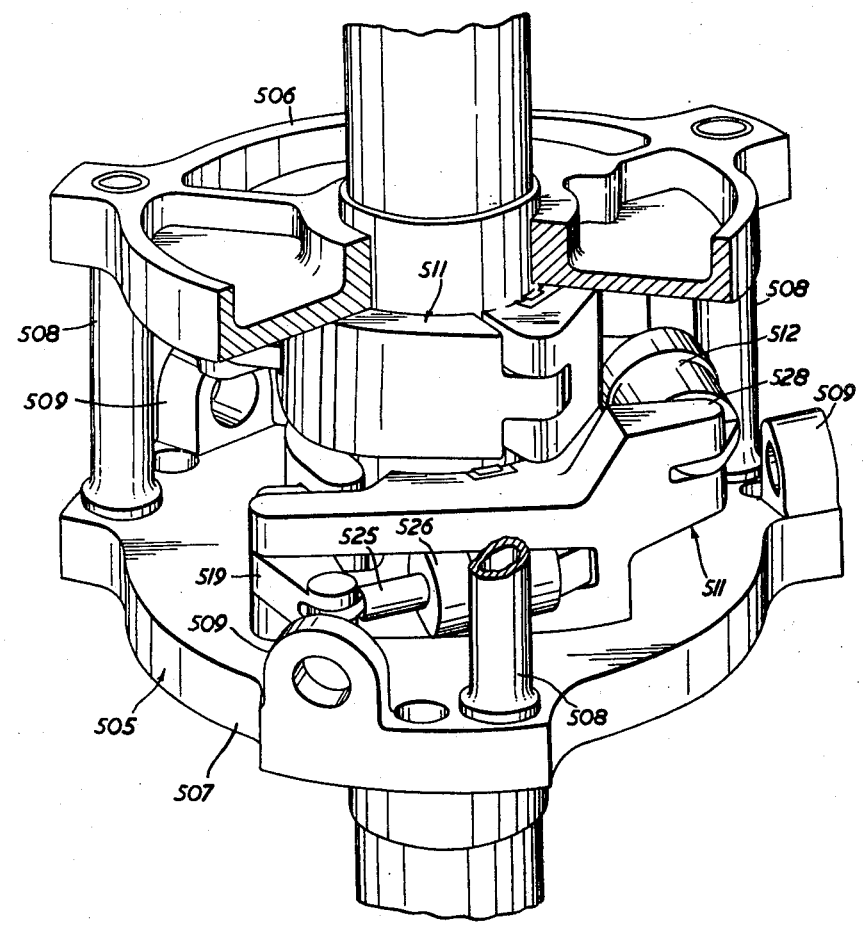
FIG. 24 is a perspective view of the break-out mechanism shown operating on a tool joint, some parts being broken away and in section to show interior details.
Figure 25:
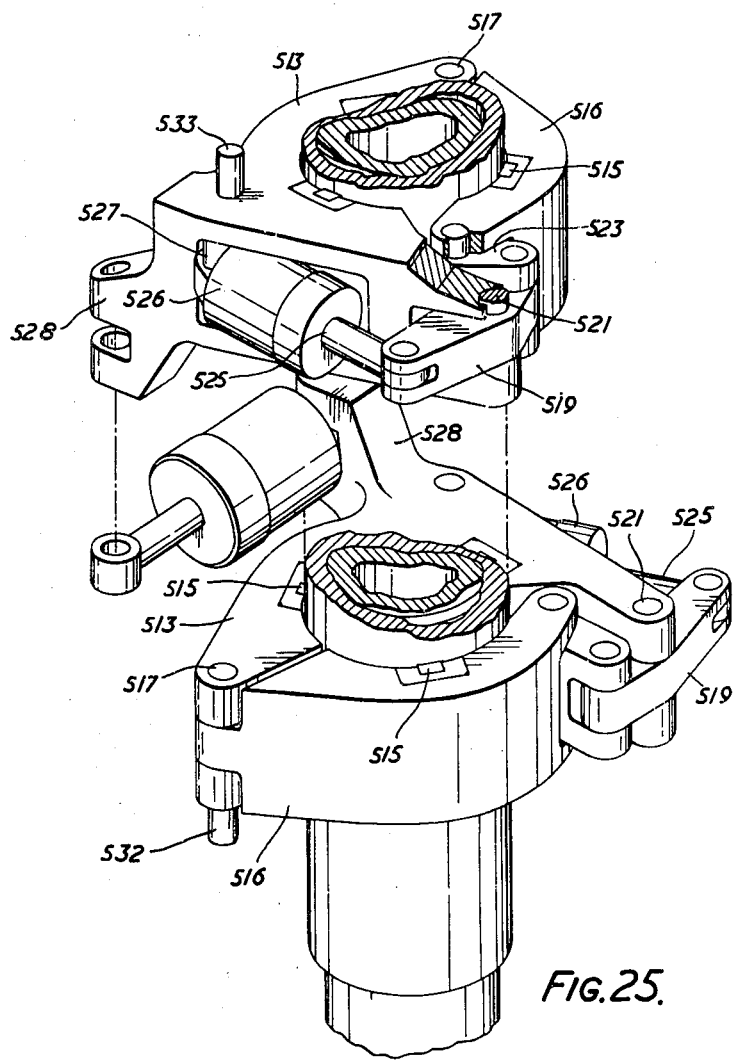
FIG. 25 is an exploded perspective view of the clamping and torque applying components of the break-out mechanism shown operating on a tool joint.

The break-out (and make-up) mechanism 324 is shown in FIGS. 24, 25 and 26. This mechanism is disclosed in an application of Richard Northam Knights, Serial No. 29,274, filed May 16, 1960, now Patent No. 3,041,901, dated July 3, 1962.

The make-up and break-out unit is mounted in a housing indicated generally at 505 and comprising a top plate 506 and a bottom plate 507 spaced apart and connected by three pillars 508. The bottom plate has three apertured lugs 509 by means of which the unit may be attached to the lift platform 313.

Mounted within the housing are two tong devices indicated generally at 511 in FIGURE 24. Both devices are similar and one is inverted in respect to the other, while a hydraulic jack 512 is interposed between them to provide the torque for making or breaking the tool joint.

One such tong device will be described. Essentially the device comprises a large tong 513 having an inner curved surface 514 carrying two pipe-gripping pads 515 and a small tong pivoted to the large tong 513 on a pin 517, this small tong 516 having an inner curved surface 518 provided with a single gripping pad 515. The three gripping pads are disposed in the operative position of the tongs to lie substantially 120° apart around the tool joint with which they engage. The outer end of the tongs 513 and 516 are interconnected by a load amplifying linkage which comprises a lever 519 mounted on a fulcrum pin 521 at the free end of the tong 513, the lever 519 having its shorter lever arm 522 pivotally connected by a link 523 to the small tong 516, and its longer lever arm 524 pivotally connected to a jack piston rod 525. The jack cylinder 526 is pivotally connected at 527 to an intermediate position on the large tong 513.

This large tong 513 has a forked lug 528 which is cranked to one side of the central plane of the tong 513 to provide a connection for a make-up and break-out jack 512 by means of a pivot pin 529 extending across the forked lug 528. Since the other tong device is inverted with respect to the one described it will have a forked lug 528 likewise cranked from the central plane of the tong 513, and the extent to which both such forked lugs are cranked is arranged to bring them into the same transverse plane so that the make-up and break-out jack 512 operates horizontally between them.

The large tong of the lower pair is resiliently located in the bottom plate 507 by a hinge pin 532 which engages a soft rubber bushing therein (but not shown) to provide adequate play for accommodating movement between the pair of tongs and the pipe joint without straining.

The large tong 513 of the upper pair has a pin 533, see FIGURE 25, corresponding to the hinge pin 517 of the lower pair, which is located within an arcuate slot 534, FIGURE 26, in the top plate 506. The pin 533 in the upper tong 513 is not to be confused with the hinge pin 517 with which it is substantially co-axial in the relative positions of the two pairs of tongs shown in FIGURE 26. The slot 534 permits the required degree of angular movement of the upper pair of tongs with respect to the lower pair of which is stationary with respect to the housing. The angle of movement provided by the jack 512 and allowed for by movement of the pin 533 in the slot 534 is sufficient both to tighten up the screw joint between two pipes, and when working in the opposite direction to break-out a fully tightened joint so that the upper pipe can be removed by spinning off under a light torsional load.

The make-up and break-out jack is extended to break-out a tool joint and it will be observed that the smaller tong 518 will trail during the break-out action. The larger area of the jack 512 is subject to fluid pressure during break-out and the grip on the tool joint is, to some extent, augmented by the trailing shoe effect of the small tong 516.

The tongs 513 and 516 are adapted to take interchangeable die holders having gripping pads 515 for engaging the tool joint. One set of die holders 535 capable of operating with the smallest diameter of tool joint is shown in chain dot line in FIGURE 26, while the pads 515 shown in full line can be fitted to operate on the largest size of tool joint. Clearly, the torque requirement for making and breaking joints in the two sizes will be widely different and it will, therefore, be convenient to vary the working pressure available at the jack 512 accordingly.

It is to be observed that in the above-mentioned description the make-up and break-out jack 512 operates directly between the two pairs of tongs 513, 516 which grip the respetcive sides of the tool joint so that the reaction load is taken directly one on the other and not through the lift platform.

THE SPIN-OFF MECHANISM

Figure 29:
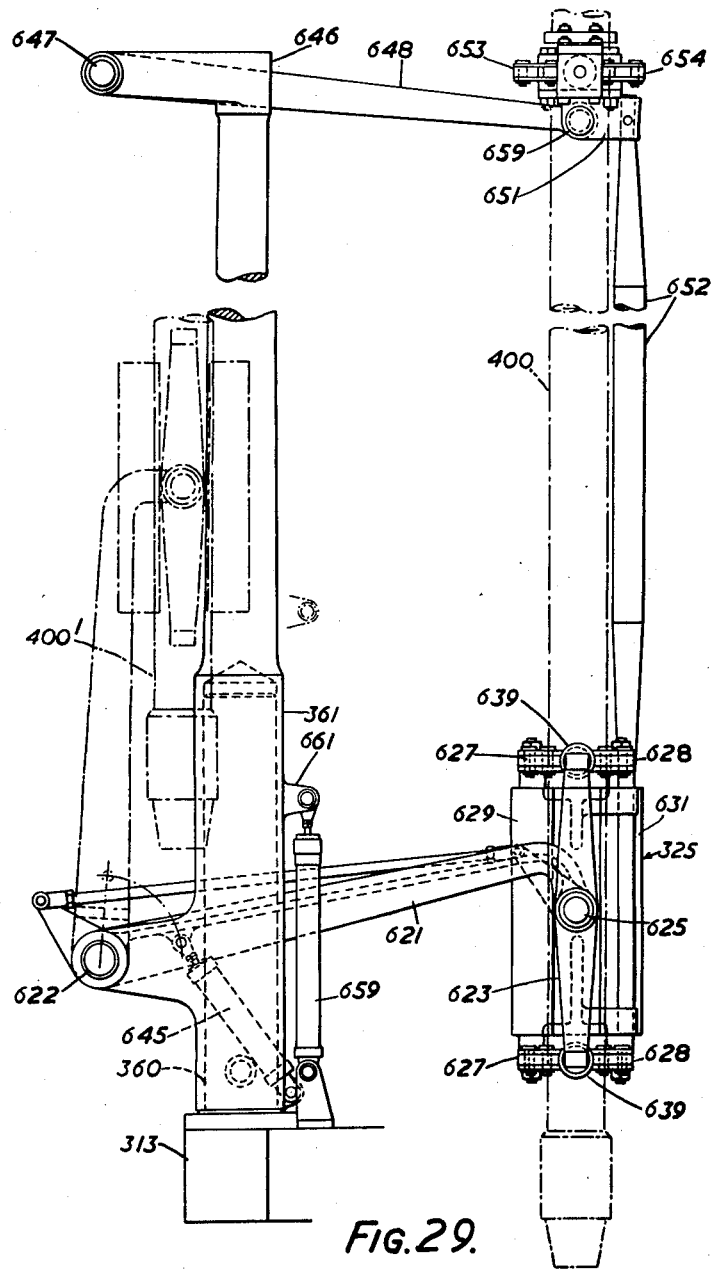
FIG. 29 is a side elevation of the spin-off mechanism.
Figure 31:
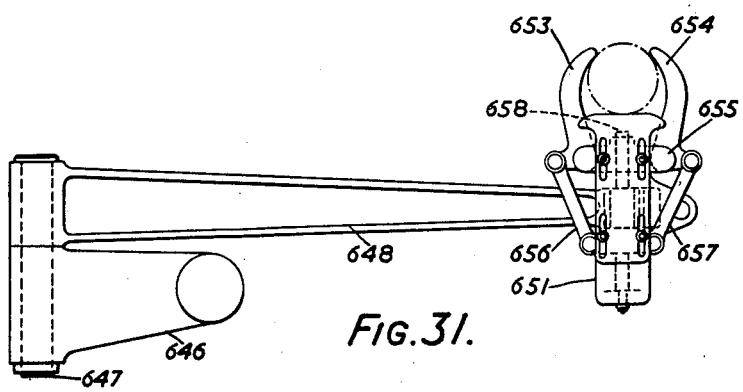
FIG. 31 is a plan view of a drill pipe steady associated with the spin-off mechanism.
Figure 30:
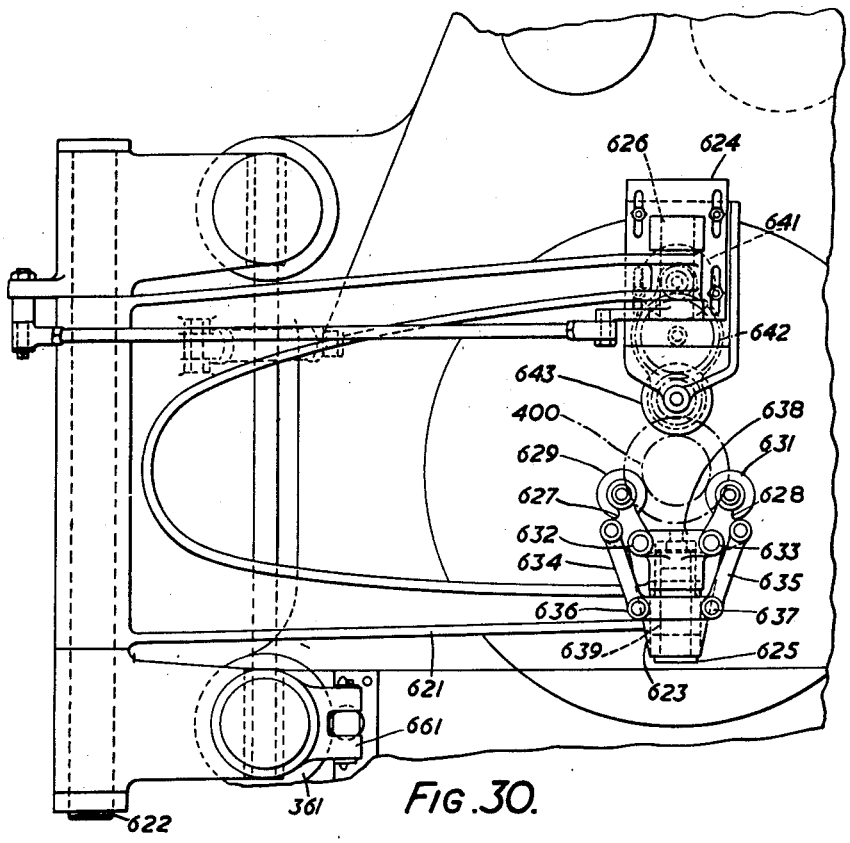
FIG. 30 is a plan view of the spin-off mechanism.

The spin-off (and spin-on) mechanism is shown in FIGS. 29, 30 and 31. This mechanism is a modification of mechanism disclosed in an application of Richard Northam Knights, Serial No. 33,158, filed June 1, 1960.

As seen in FIG. 27 the upper lift platform 313 carries a rigid pillar 360 (see FIG. 29 also) on which a vertical column 361 (see also FIG. 15) is slidably mounted. As shown in FIGS. 27, 29 and 30, a forked arm 621 is carried by a pivot 622 near the base of the column 361 while the outer end of the arm 621 carries the spin-off mechanism 325. This mechanism comprises a carriage formed in two parts 623 and 624 which are mounted on pivots 625 and 626 fixed transversely in the respective ends of the fork 621. The carriage part 623 has two arms 627 and 628 carrying idling rollers 629 and 631 respectively on vertical axes. The arms 627 and 628 can be turned about pivots 632 and 633 by links 634 and 635, the latter being mounted on pivots 636 and 637 which are fixed to the carriage part 623 while the arm pivots 632 and 633 are carried by a movable cross-head 638 controlled by a hydraulic piston and cylinder device 639. The arrangement of arms carrying the rollers, links, and piston and cylinder devices 639 is duplicated at opposite ends of the rollers 629 and 631. The carriage part 624 comprises a torque motor 641 which operates through reduction gearing 642 on a driving roller 643 which is carried on a vertical axis. Thus the idling rollers 629 and 631 are capable of being closed together by the piston and cylinder devices 639 to engage on opposite sides of a pipe length 400 and force it into frictional engagement with the driving roller 643, while the pivotal mounting of both carriage parts 623 and 624 on the forked arm 621 enables a grip to be maintained on the pipe length when the forked arm 621 is turned about its pivot 622.

Turning movement of the forked arm 621 is effected by a hydraulic jack 645 (FIG. 29) which is pivotally interposed between the base of the column 361 and the forked arm 621.

The upper end of the column 361 has a bracket 646 carrying a pivot 647 for a link 648, see also FIGURE 31, while the outer end of the link 648 is connected by a pivot pin 649 to a carriage 651. A connecting rod 652 which is rigidly joined at its upper end to the carriage 651 and at its lower end to the carriage part 623, acts in conjunction with the forked arm 621 and link 648 to provide parallel motion of the lower and upper carriages. The upper carriage serves to provide a steady for the upper end of the pipe length 400 by means of two locating but non-gripping jaws 653 and 654 which are pivoted on a cross-head 655, while links 656 and 657 which are pivoted to the carriage 651 impart opening and closing movement to the jaws 653 and 654 by means of a hydraulic piston and cylinder device 658 acting between the cross-head 655 and the carriage 651. Opening and closing movement of the idling rollers 629 and 631 of the jaws 653 and 654 is co-ordinated so that a pipe length can be engaged or disengaged either in the position 400 in FIGURE 29 where the pipe length is co-axial with the drill string, or in the position 400′ where the pipe length is off-set from the drill string to one side of the rig for transfer to the racking mechanism.

Relative vertical motion of the spin-off mechanism is provided for separating the pipe length 400 from the drill string when spinning off and for bringing the pipe length 400 towards the drill string when spinning on. For this purpose a hydraulic jack 659 is interposed between the upper lift platform 313 and a lug 661 on the side of the column 361. The forked arm 621 supports the pipe length 400 by means of the spinning-off mechanism 325 in such a position that the lower end of the pipe length can pass between the arms of the fork when the latter is turned between the extreme positions shown in FIG. 29.

The forked arm 621 is shown in FIG. 27 in the raised position at which a pipe length can be transferred from the spin-off mechanism to the racking mechanism, or vice versa.

THE RACKING MECHANISM

As earlier described the racking mechanism comprises transport arm 330, racking arm structure 331 and rack structures 332 (FIGS. 15 and 16). As will be seen in FIGS. 16 and 27 the outer end portion of the transport arm 330 carries a parallelogram motion linkage comprising two links 665 and 666 pivoted to the arm 330, together with an auxiliary arm 667 interconnectnig the outer ends of the links 665 and 666. The auxiliary arm 667 carries a pair of power-operated pipe gripping jaws 668 and 669 of similar construction diagrammatically shown in FIG. 32. A bracket 680 extending from the auxiliary arm 667 carries a hinge pin 681 for two jaws 682 having circular recesses shaped to engage the drill pipe 400. The two jaws 682 have integral tails 683 which extend rearwardly and have a pair of toggle links 684 connected between them. The center pivot 685 of the toggle linkage has the cylinder of a hydraulic jack 686 connected to it while the piston of the hydraulic jack is anchored to the hinge pin 681. If the operating jack 686 is extended the toggle formed by the links 684 breaks, thereby drawing the tails 683 together and opening the jaws 682. Contraction of the jack 686 turns the toggle links 684 into line thus closing the jaws 682 together. If the links 684 are slightly over top dead center in the contracted position of the jack 686 the jaws 682 will remain closed in the event of a hydraulic failure, thus minimising the risk of a pipe coming adrift from the transport arm 330.

When pulling out or running in pipe the auxiliary arm 667 is maintained extended as shown in FIGS. 16 and 27 by a hydraulic jack 671 which is interposed between the transport arm 330 and the link 665. With the auxiliary arm 667 thus extended the transport arm 330 is operable to transfer pipe sections one at a time between the spin-off mechanism 325 and the racking arm 340.

For the drilling operation, the upper lift platform 313 will be fitted with a power swivel 323 and it is required to deliver each new pipe section in a position below the power swivel when the upper lift platform 313 is fully raised. This position will be considerably below the position (see FIG. 27) at which a pipe section is accepted or delivered during the pulling out or running in operation. The hydraulic jack 671 together with the parallelogram linkage 665, 666, and 667 is accordingly operable to hold a pipe 400 in this required lower position co-axial with the drill string as shown in FIG. 28. The jack 671 is seen to be contracted whereby the links 665 and 666 extend generally downwardly, but also towards the center of the derrick 310 so that in the lower limiting positions the pipe grips 668 and 669 carried by the auxiliary arm 667 hold a pipe length 400 co-axial with the drill string. Operation of the hydraulic jack 671 is co-ordinated with the operation of the hydraulic jack 334 which controls the transport arm 330 so that the jack 671 controlling the auxiliary arm 667 is fully extended when the transport arm 330 is near the horizontal position shown in FIG. 16, but is fully contracted during upward swinging movement of the transport arm 330, to bring the auxiliary arm 667 into the position shown in FIG. 28. In this position, the new single can be joined at its lower end to the end of the drill string while the latter is partly raised by the lower lift platform 314 to take the weight off the drilling bit and during which the drill string is supported by the ground slips 326. The upper end of the new single is joined to the power swivel 323 which is carried above it by the upper lift platform 313 whereupon the ground slips 326 may be released so that the drilling operation can proceed.

Turning now to the racking arm structure 331 shown in FIG. 15, the outer arm 340 thereof carries a pipe gripping mechanism 372 which is kept in a constant attitude irrespective of the positions of the arms 337 and 340 by means of two parallelogram linkages of which the arms 337 and 340 respectively form two of the long sides. The other long sides are provided by links 373 and 374 whose effective lengths are equal to those of the arms 337 and 340, these links being interconnected by a bell crank lever 375. The lower end of the link 373 is carried by a pivot 377 on the base bracket 339 while the outer end of the link 374 is connected by a pivot 378 to the pipe gripping mechanism 372.

The latter mechanism shown on a larger scale in FIGURE 33 comprises a plate 381 having a fixed jaw 382 and a moving jaw mounted thereon by a pivot 384, a hydraulic jack 385 pivotally interposed between the plate 381 and a lug 386 on the jaw 383 so as to turn the latter between the full line position shown in the drawing and the open position shown in chain dot line at 383'. It is to be observed that in the open position the moving jaw 383 is swung back far enough to allow a pipe length 400 carried by the transport arm 330 to move vertically downwards past the open jaw 383' into a position where the latter can be closed on the pipe length by the jack 385. The jaws 382 and 383 are duplicated so as to support the pipe length at spaced points between the pipe grips 668 and 669 on the transport arm 330.

By control of the hydraulic jacks 342 and 345 the pipe gripping mechanism 372 on the outer arm 340 can be brought to any position within the confines of the rack structure 332 now to be described. As shown in FIGS. 15 and 16 this structure mounted on a base 391 comprises two end sections 392 and 393 each having side walls 394 supported by gracing struts 395. A plurality of vertical divisions 396 which are open at the top are fixed in the end sections 392 and 393 at a spacing which allows the pipe lengths to be stacked singly between them. The end sections 392 and 393 are spaced apart wider than the spacing between the two sets of jaws 382 and 383 on the arm 340 so that the latter can move freely to any position to deposit a pipe in the rack structure or to take one away. The pipe lengths are deposited in the rack structure in horizontal layers and taken away in like manner.

The racking mechanism is operated automatically with its sequence of operations held in step with the sequence of operations of the lift mechanisms when the latter are pulling out or running in a drill string, whereby each pipe length is conveyed from the spin-off mechanism 325 to the rack 332 in the one case or is raised from the rack to the spin-off mechanism (now operating reversibly as a spin-on mechanism) in the other case, under automatic guidance and control.

Both the transport arm 330 and the racking arm 340 have to be moved between precisely defined positions and the arms may be moved into these positions under the control of servomotor devices of the kind which include position selecting means and position follow-up devices acting differentially on the servomotors.

The racking mechanism described is a modification of mechanism disclosed in the previously mentioned application Serial No. 33,158 of R. H. Knights.

POWER SWIVEL

The power swivel 323 is shown in FIGS. 19 and 20. It comprises a hydraulic motor having pressure and return pipes 455 and 456 and a third pipe 457 for mud which is to be fed through a drill pipe adaptor 459 emerging from the base of the hydraulic motor. The power swivel 323 has three equally spaced legs 461 extending downwardly within the circular opening 327 in the upper lift platform 313 which is provided with six hydraulically actuated locking pins 329 at equally spaced positions around the opening 327. The legs 461 have locating holes 463 near their lower ends by means of which the legs are secured in the opening 327 by three alternate locking pins 329. The break-out mechanism 324 also disposed in the opening 327 has its three apertured lugs 509 equally spaced between the legs 461 of the power swivel, the holes 474 in the lugs 509 being engaged by the other three locking pins 329. A locking pin 329 and its associated hydraulic mechanism is shown in the fragmentary section in the lower centre of FIG. 19. In this case the locking pin is engaging a lug 509 on the break-out mechanism 324. However, the locking mechanism is the same at the other positions around the opening 327. The locking pin 329 slides through one end of a cylinder 465 and it has an enlarged head 466 engaging the bore of the cylinder 465 while an annular space 460 surrounds the locking pin 329 between the head 466 and the inner end of the cylinder 465, into which space 460 hydraulic fluid may be supplied to retract the pin 329 and from which hydraulic fluid may be released so that the pin can extend under the influence of a spring 467.

The circular opening 328 in the lower lift platform 314 has an inwardly directed flange 469 at the upper face of the lift platform 314 forming a ledge on which the break-out mechanism 324 and the legs 461 of the power swivel 323 may stand when the two lift platforms 313 and 314 are together as shown in FIG. 20, with the break-out mechanism 324 and the power swivel 323 attached to the upper lift platform 313 by the six locking pins 329. If, therefore, these locking pins are withdrawn by admitting hydraulic fluid to the annular spaces 460, the power swivel 323 and break-out mechanism 324 will rest on and be supported solely by the flange 469 on the lower lift platform 314 without undergoing any movement relative to the two platforms. The power swivel 323 may be centrally located on the lower lift platform 314 by means of dowel pins 471 provided on the ledge 469 which enter registering holes provided in the bottoms of the legs 461.

As shown in FIG. 20 the lower lift platform 314 has a slips mechanism 322 lying within the opening 328. It will be understood that the platform 314 is equipped with hydraulically actuated locking pins (not shown) of similar character to the locking pins 329 shown in FIG. 19 for engagement with the holes 407 in the lugs 406 of the slips mechanism 322. The latter is not essentially used during the drilling operation as the ground slips 326 can support the drill string when a new single is being added, but the slips mechanism can remain in the lower lift platform 314 in its open position as it will not interfere with the drilling operation.

When the drill string is to be pulled out at the end of a drilling operation the power swivel 323 will be removed from the upper lift platform 313 and a slips mechanism 322 for the upper lift platform secured to it by the same locking pins 329 which previously secured the power swivel 323.

The power swivel attachment and transfer mechanism just described is more fully disclosed in an application of Angus Rayfield Pitt and Sidney William Henry Wood, Serial No. 44,912, filed June 15, 1960.

It should be pointed out that the present disclosure is by way of example only and that it is not intended thereby to limit the invention in its broader aspects to any particular combination or arrangement of parts such as shown and described since various changes and modifications may be made and other types of rig employing other arrangements of parts or mechanisms co-operating to carry out the inventive concept are possible and are to be regarded within the ambit of this invention.

I claim:

1. An earth drilling rig for handling a drill pipe string consisting of a plurality of connected drill pipe sections, comprising a plurality of vertically movable pipe string pulling mechanisms, means operable during the vertical movement of said mechanisms for causing said mechanisms to successively engage, pull and release said pipe string, and means carried by at least one of said mechanisms for disconnecting pipe sections from said pipe string while said string is in motion.

2. An earth drilling rig for handling a drill pipe string consisting of a plurality of connected drill pipe sections, comprising at least two pipe pulling lifts movable along the drilling axis of the rig, means mounted on each of said lifts for engaging and supporting said pipe string and operable successively to support said pipe string to move with the associated lift, and means carried by at least one of said lifts for disconnecting pipe sections from said pipe string while said string is being pulled.

3. An earth drilling rig for handling a drill pipe string consisting of a plurality of connected drill pipe sections, comprising two pipe string pulling lifts movable independently along the drilling axis of the rig, means mounted on each of said lifts operable to engage and support said pipe string and thereby enable the lift carrying said pipe engaging means to pull said pipe string, means carried by at least one of said lifts operable to disconnect pipe sections from said pipe string, and means for so controlling the movement of said lifts and the operation of said pipe engaging means and said disconnecting means that the pulling action is transferred back and forth between said lifts and pipe sections are disconnected from said pipe string while said string is in motion.

4. An earth drilling rig as claimed in claim 3 wherein said pipe disconnecting means comprises a break-out mechanism operable to engage and break the joint between adjacent connected pipe sections, and a spinning-off mechanism operable after said break-out mechanism has broken the joint to unscrew the pipe section above said joint.

5. An earth drilling rig as claimed in claim 3 including means carried by at least one of said lifts for removing disconnected pipe sections from the path of said pipe string.

6. An earth drilling rig as claimed in claim 3 wherein at least one of said lifts includes a hydraulic ram having a plurality of pressure chambers, and means for selectively connecting said chambers to a source of hydraulic pressure so as to vary the thrust exerted by said ram independently of the pressure of said source.

7. An earth drilling rig as claimed in claim 6 wherein said pressure chambers are of different effective thrust areas and at least one of said chambers is so arranged as to provide a thrust in a direction opposite to the thrust provided by another of said chambers.

8. An earth drilling rig as claimed in claim 3 wherein each of said lifts includes a pair of hydraulic rams for moving said lift, the rams of each lift being symmetrically located on opposite sides of the drilling axis of the rig.

9. An earth drilling rig as claimed in claim 8 wherein the rams of one lift straddle the rams of the other lift which in turn straddle the drilling axis of the rig, so that all of said rams lie in a common plane.

10. An earth drilling rig for pulling a drill pipe string consisting of a plurality of connected drill pipe sections of substantially uniform length, comprising at least two pipe pulling lifts having operating strokes along the drilling axis of the rig which overlap at least in part, the total distance covered by the operating strokes of said lifts being substantially equal to the length of a pipe section, means mounted on each of said lifts for engaging and supporting said pipe string and operable successively to support said pipe string and thereby enable the lifts carrying said pipe engaging means to pull said pipe string, and means carried by at least one of said lifts for disconnecting pipe sections from said pipe string while said string is being pulled.

11. An earth drilling rig for handling a drill pipe string consisting of a plurality of connected drill pipe sections, comprising a first pipe string pulling lift reciprocable over a given operating stroke along the drilling axis of the rig, pipe engaging means mounted on said first lift, for engaging and supporting said pipe string to move with said lift, a second reciprocable pipe string pulling lift having an operating stroke in line with the operating stroke of said first lift, pipe engaging means mounted on said second lift for engaging and supporting said pipe string to move with said second lift, means for driving each of said lifts over its operating stroke, control means for effecting engagement and disengagement between each of said pipe engaging means and said pipe string as each of said lifts commences and completes an operating stroke, the pipe engaging means mounted on at least one of said lifts including means for disconnecting pipe sections from said pipe string, and control means for actuating said disconnecting means during the engagement of said pipe engaging means with the pipe.

12. An earth drilling rig comprising a first drill string pulling lift, pipe engaging means on said lift operable to engage and support said pipe string to render said lift operable to pull said pipe string, a first set of pipe joint dismantling means on said lift, a second drill string pulling lift, pipe engaging means on said second lift operable to engage and support said pipe string to render said second lift operative to pull said pipe string, a second set of pipe joint dismantling means on said second lift, said lifts having operative strokes which overlap at least to the extent of the distance between successive pipe joints in the drill pipe string, and means for rendering each of said lifts and each of said sets of pipe joint dismantling means operable in turn to engage the string, pull the string and dismantle pipe from said string.

13. An earth drilling rig comprising a first drill string pulling lift operable to pull the drill string over a stroke at least in excess of half the length of a drill pipe single, a second drill string pulling lift also operable to pull the drill string over a stroke at least in excess of half the length of a drill pipe single, in continuation of the stroke of said first lift, whereby said lifts between them are operable to pull the drill string over a stroke at least in excess of a drill pipe single, means on one of said lifts for engaging and supporting the drill pipe string, pipe joint dismantling means on the other of said lifts, and control equipment for causing each of said lifts to operate in turn to pull said drill string, and for causing said pipe joint dismantling means to dismantle pipe from said string.

14. An earth drilling rig for pulling a drill pipe string consisting of a plurality of connected drill pipe sections, comprising at least two lifts movable one above another along the drilling axis of the rig and having operating strokes which overlap one another, the total distance covered by the operating strokes of said lifts being substantially equal to the length of at least one pipe section, means mounted on each of said lifts operable successively to engage and support said pipe string and thereby render the associated lift operable to pull said pipe string, and means carried by at least one of said lifts for disconnecting pipe sections from said pipe string while said string is being pulled.

15. An earth drilling rig for handling a drill pipe string consisting of a plurality of connected drill pipe sections, comprising at least two pipe pulling lifts movable along the drilling axis of the rig and having operating strokes one above another and overlapping in part, means mounted on each of said lifts operable successively to so engage said pipe string as to render the lift carrying said pipe engaging means operable to pull said pipe string, means carried by at least one of said lifts for disconnecting pipe sections from said pipe string while said string is being pulled, and means carried by an upper one of said lifts for removing disconnected pipe sections from the path of the drill string.

16. An earth drilling rig as claimed in claim 15 including means carried by at least one of said lifts for lowering disconnected pipe sections on the return stroke of the lift to a predetermined position for transfer to a storage location.

17. An earth drilling rig for handling a drill pipe string consisting of a plurality of connected drill pipe sections, comprising a plurality of vertically movable pipe string pulling mechanisms engageable with said pipe string for supporting and pulling said pipe string and operative successively to engage and pull said pipe string, said mechanisms being movable one above another and having operating strokes which overlap one another and which cover between them a distance equal substantially to the length of at least one pipe section, and means carried by the uppermost one of said mechanisms for disconnecting pipe sections from said pipe string while said string is in motion.

18. An earth drilling rig as claimed in claim 17 wherein said pipe disconnecting means comprises a break-out mechanism operable to engage and break the joint between adjacent connected pipe sections, and a spinning-off mechanism operable after said break-out mechanism has broken the joint to unscrew the pipe section above said joint.

19. An earth drilling rig as claimed in claim 17 including means carried by said uppermost lift for removing disconnected pipe sections from the path of said pipe string.

20. An earth drilling rig as claimed in claim 19 including means carried by said uppermost lift for lowering disconnected pipe sections on the return stroke of said lift to a predetermined position for transfer to a storage location.

21. An earth drilling rig for pulling a drill pipe string consisting of a plurality of connected drill pipe sections, comprising at least two vertically movable pipe string pulling mechanisms engageable with said pipe string for supporting and pulling said pipe string and operative successively to engage and pull said pipe string, the operating strokes of said mechanisms being disposed one above the other, and means carried by one of said mechanisms for disconnecting pipe sections from said pipe string while said string is in motion.

22. An earth drilling rig for pulling a drill pipe string consisting of a plurality of connected drill pipe sections, comprising at least two vertically movable pipe string pulling lifts operable over different strokes disposed one above the other, means carried by said lifts for successively engaging said pipe string so as to render the associated lift operative for pulling said pipe string, and break-out mechanism carried by one of said lifts for breaking the joints between adjacent pipe sections while said pipe string is in motion.

23. An earth drilling rig as claimed in claim 22 including means carried by the upper lift for removing a disconnected pipe section from the path of said pipe string.

24. An earth drilling rig for pulling a drill pipe string consisting of a plurality of connected drill pipe sections of substantially uniform length, comprising two vertically reciprocable pipe pulling lifts having operating strokes disposed one above the other, the total distance covered by the operating strokes of said lifts being substantially equal to the length of a pipe section, means mounted on each of said lifts for engagement with said pipe string to render the lift carrying said pipe engaging means operative to pull said pipe string, means carried by one of said two lifts for disconnecting pipe sections from said pipe string while said string is being pulled, and means carried by the upper of said two lifts for displacing a disconnected pipe section laterally out of the path of said pipe string and, on the downward stroke of said upper lift, for lowering said disconnected pipe section toward a storage location.

25. An earth drilling rig for pulling a drill pipe string consisting of a plurality of connected drill pipe sections, comprising upper and lower vertically movable pipe string pulling lifts having collinear operative strokes disposed one above the other, means mounted on said lifts for alternately so engaging said pipe string as to render the associated lift operable for pulling said pipe string so as to maintain continuous movement thereof, and means carried by said upper lift for dismantling pipe sections from said pipe string while said string is in motion.

26. An earth drilling rig for pulling a drill pipe string consisting of a plurality of connected pipe sections, said rig comprising upper and lower pipe pulling mechanisms reciprocable over operating strokes disposed one above the other and operative alternately to engage and pull said pipe string, the total distance covered by the operating strokes of said upper and lower mechanisms being substantially equal to the length of a pipe section, said upper mechanism including means for disconnecting pipe sections from said pipe string while said string is being pulled.

27. An earth drilling rig for pulling a drill pipe string consisting of a plurality of connected drill pipe sections, comprising a first pipe pulling lift, means mounted on said first lift for engaging said pipe string to render said first lift operative for pulling said pipe string upwardly for a predetermined distance, a second pipe pulling lift having an operating stroke in line with and extending above the operating stroke of said first lift, means mounted on said second lift for engaging said pipe string to render said second lift operative for pulling said pipe string upwardly for a further distance, and means moving with said second lift for dismantling pipe sections from said pipe string while said string is being pulled.

28. An earth drilling rig for pulling a drill pipe string consisting of a plurality of connected drill pipe sections, comprising a first pipe pulling lift, means mounted on said first lift for so engaging said pipe string as to render said first lift operable for pulling said pipe string upwardly for a predetermined distance, a second pipe pulling lift having an operating stroke in line with and extending above the operating stroke of said first lift, means mounted on said second lift for so engaging said pipe string as to render said second lift operable for pulling said pipe string upwardly for a further distance, and reversible mechanism moving with said second lift for dismantling pipe sections from and adding pipe sections to said pipe string while said string is in motion.

29. An earth drilling rig for handling a drill pipe string consisting of a plurality of connected drill pipe sections, comprising a first pipe pulling lift, means mounted on said first lift for so engaging said pipe string as to render said first lift operable for pulling said pipe string upwardly for a predetermined distance, a second pipe pulling lift having an operating stroke in line with and extending above the operating stroke of said first lift, means mounted on said second lift for so engaging said pipe string as to render said second lift operable for pulling said pipe string upwardly for a further distance, and means carried by one of said lifts for breaking the joints between adjacent pipe sections while said pipe string is in motion.

30. An earth drilling rig for handling a drill pipe string consisting of a plurality of connected drill pipe sections, comprising a first lift reciprocable over a given operating stroke along the drilling axis of the rig, pipe engaging means mounted on said first lift so engageable with said pipe string as to move it with said first lift, a second reciprocable lift having an operating stroke in line with and extending above the operating stroke of said first lift, pipe engaging means mounted on said second lift so engageable with said pipe string as to move it with said second lift, means for driving each of said lifts over its operating stroke in turn, control means for effecting engagement and disengagement between said pipe string and each of said pipe engaging means in turn as each of said lifts commences and completes an operating stroke, the pipe engaging means mounted on said second lift including means for disconnecting pipe sections from said pipe string, and control means for actuating said disconnecting means during the engagement with the pipe string of the pipe engaging means mounted on said second lift.

References Cited by the Examiner
UNITED STATES PATENTS

| | | | |
|---|---|---|---|
| 2,450,934 | 10/48 | Calhoun | 166—77.5 |
| 2,735,556 | 2/56 | Stone | 214—2.5 |
| 2,737,839 | 3/56 | Paget | 214—2.5 XR |
| 2,773,605 | 12/56 | De Jarnett | 214—2.5 |
| 2,781,185 | 2/57 | Robbins | 175—85 |
| 2,867,338 | 1/59 | Simmonds | 214—2.5 |
| 3,002,560 | 10/51 | Paget | 166—77.5 |

CHARLES E. O'CONNELL, *Primary Examiner.*